United States Patent
Lim et al.

(10) Patent No.: US 9,824,139 B2
(45) Date of Patent: Nov. 21, 2017

(54) METHOD OF SEARCHING FOR INTEGRATED MULTILINGUAL CONSONANT PATTERN, METHOD OF CREATING CHARACTER INPUT UNIT FOR INPUTTING CONSONANTS, AND APPARATUS FOR THE SAME

(71) Applicant: NeonBerry Inc., Seoul (KR)

(72) Inventors: Inkeon Lim, Seoul (KR); Hosun Woo, Seoul (KR)

(73) Assignee: NeonBerry Inc., Seoul (KR)

( * ) Notice: Subject to any disclaimer, the term of this patent is extended or adjusted under 35 U.S.C. 154(b) by 411 days.

(21) Appl. No.: 14/549,901

(22) Filed: Nov. 21, 2014

(65) Prior Publication Data

US 2015/0199426 A1    Jul. 16, 2015

(30) Foreign Application Priority Data

Jan. 11, 2014 (KR) ........................ 10-2014-0003657

(51) Int. Cl.
*G06F 17/27* (2006.01)
*G06F 17/21* (2006.01)
*G06F 17/30* (2006.01)

(52) U.S. Cl.
CPC .... *G06F 17/30696* (2013.01); *G06F 17/2765* (2013.01); *G06F 17/3064* (2013.01)

(58) Field of Classification Search
CPC .. G06F 17/2785; G06F 17/289; G06F 17/279; G06F 17/2755; G06F 17/21; G06F 17/275; G06F 17/212; G06F 17/2223; G06F 17/273; G06F 17/2872; G10L 2015/088; G10L 15/005; G10L 15/2015; G10L 15/088
USPC ....................................... 704/1–10
See application file for complete search history.

(56) References Cited

U.S. PATENT DOCUMENTS 5,634,134 A * 5/1997 Kumai ........................ B41J 3/46
                                                    704/8
5,818,437 A * 10/1998 Grover .................. G06F 3/0219
                                                    715/811
6,205,418 B1 * 3/2001 Li .......................... G06F 17/289
                                                    704/8

(Continued)

FOREIGN PATENT DOCUMENTS

KR         10-0286897 B1      4/2001
KR         10-0288799 B1      5/2001
KR    10-2013-0019441 A       2/2013

*Primary Examiner* — Edgar Guerra-Erazo
(74) *Attorney, Agent, or Firm* — NSIP Law

(57) ABSTRACT

Provided are an integrated multilingual consonant pattern search method and apparatus for extracting original strings, in correspondence with a number that is small compared to that of a conventional technology, as a search result and displaying the search result, by inputting a consonant pattern which is formed of a plurality of consonants, with respect to an original string list that is pre-stored in a database in a language written with a phonogram in which an initial consonant and a final consonant are distinguished from each other. Provided are also a method and apparatus for generating a character input unit for inputting consonant characters to be searched fast with a low typing error rate, by using the integrated multilingual consonant pattern search method.

25 Claims, 24 Drawing Sheets

(56) References Cited

U.S. PATENT DOCUMENTS

| | | | | |
|---|---|---|---|---|
| 6,307,548 B1* | 10/2001 | Flinchem | ............. | G06F 3/0237 341/22 |
| 6,307,549 B1* | 10/2001 | King | .................... | G06F 3/0219 341/23 |
| 6,631,501 B1* | 10/2003 | Jurion | .................. | G06F 17/214 345/171 |
| 6,885,317 B1* | 4/2005 | Gutowitz | ............... | G06F 3/0237 341/22 |
| 7,016,896 B2* | 3/2006 | Shibuya | ............ | G06F 17/30985 |
| 7,286,115 B2* | 10/2007 | Longe | .................. | G06F 3/0236 345/156 |
| 7,580,829 B2* | 8/2009 | James | .................. | G06F 3/0236 345/171 |
| 7,991,608 B2* | 8/2011 | Johnson | ............ | G06F 17/30669 704/10 |
| 2002/0123995 A1* | 9/2002 | Shibuya | ............ | G06F 17/30985 |
| 2002/0126097 A1* | 9/2002 | Savolainen | ........... | G06F 3/0237 345/168 |
| 2002/0196163 A1* | 12/2002 | Bradford | .............. | G06F 3/0233 341/22 |
| 2005/0060448 A1* | 3/2005 | Gutowitz | ................ | G06F 3/018 710/72 |
| 2005/0198023 A1* | 9/2005 | James | .................. | G06F 3/0236 |

\* cited by examiner

FIG. 14A

| あ | か | さ |
|---|---|---|
| た | な | は |
| ま | や | ら |
|   | わ |   |

FIG. 14B

| ゛゜ | か | さ |
|---|---|---|
| た | な | は |
| ま | ら | ん |

METHOD OF SEARCHING FOR INTEGRATED MULTILINGUAL CONSONANT PATTERN, METHOD OF CREATING CHARACTER INPUT UNIT FOR INPUTTING CONSONANTS, AND APPARATUS FOR THE SAME

RELATED APPLICATION

This application claims the benefit of Korean Patent Application No. 10-2014-0003657, filed on Jan. 11, 2014, in the Korean Intellectual Property Office, the disclosure of which is incorporated herein in its entirety by reference.

BACKGROUND

1. Field

One or more embodiments of the present invention relate to an integrated multilingual consonant pattern search method and apparatus for performing an integrated search according to a representative language, based on a consonant pattern in an arbitrary location, which may be non-consecutive, with respect to an original string list of a language that is written with a phonogram in which an initial consonant and a final consonant are distinguished from each other. Also, one or more embodiments of the present invention relate to a method of creating a character input unit for inputting consonants.

2. Description of the Related Art

A prefix search method and a substring search method are conventional methods of searching for data that is formed of strings such as a person's name, an address, or a word.

The prefix search method is to compare a string to be searched for to a whole string to be searched for, which is stored in a database (DB), or to characters of respective words in the string to be searched for, which is stored in a DB, from a first character in correspondence with a length of the string to be searched for. Then, if the string to be searched for matches the whole string or the characters of the respective words in the string, the string to be searched for is added to a search result list. The prefix search method may be very easily implemented. Additionally, particularly when string lists in the DB are sequentially sorted, the prefix search method allows to find a result at a high speed by using a binary search method or the like. However, when a user does not know a prefix of a string or a word, the user may not search for the string or the word by using the prefix search method.

Additionally, a substring search method, which is one of conventional data search methods, is to add a string to be searched for to a search result list, if a string for searching is included in the string to be searched for, which is stored in a DB. Since the substring search method may be easily implemented by using a basic function, which is provided by most operating systems (OS) mounted in a mobile apparatus, the substring search method is frequently used in a case of a search for a small amount of data. However, unless a vast amount of indexing is performed, a high-speed search based on sorting may not be performed by using the substring search method. Accordingly, whenever a search is performed, all strings stored in a DB need to be compared and searched for one by one. When there are a lot of pieces of data, a search speed may become so slow that a user may become impatient while performing a search. Particularly, since a fast search when using a mobile apparatus is inevitable to satisfy a user's need for a search and ensure a user's safety, a slow search speed may cause additional side effects. For example, while a user is using a mobile apparatus and moving to another place, if the user needs to repeatedly performing data filtering for several times due to a slow search speed, a possibility of a safety accident may be increased. Accordingly, the substring search method is not appropriate for a high-speed search of a large capacity of data, such as in an address book or a dictionary. Additionally, a non-consecutive character pattern may not be searched for by using the substring search method.

Due to such problems, there is a rising demand for greatly reducing a number of inputting characters and scrolling a screen while allowing a high-speed search, so as to perform a fast, convenient, and efficient data search by using a mobile apparatus.

SUMMARY

A mobile apparatus that is based on mobility, such as a mobile communication terminal, a vehicle navigator, or an electronic dictionary, does not provide a physical keyboard via which characters may be efficiently input fast with a low typing error rate, such as a keyboard for a PC.

Accordingly, in order to search for data stored in an apparatus, in a case of a feature phone or an electronic dictionary having physical, though, a small amount of buttons, character buttons need to be pressed to input characters and arrow buttons need to be pressed to scroll a list on a screen. In a case of a smartphone or a vehicle navigator having few buttons, keys of a virtual keyboard, displayed on a small screen, need to be touched by using a finger to input characters and a list needs to be dragged to scroll the screen. While a user is moving to another place, if a lot of character need to be input and a screen needs to be scrolled for several time, a fast processing of a data search may be difficult, and the user may feel inconvenient.

In other words, conventional data search methods may need excessive character inputs and screen scrolling. Accordingly, one or more embodiments of the present invention include a data search method based on a consonant pattern that may be non-consecutive, so as to greatly reduce a number of inputting characters and an amount of scrolling while data is being searched.

Additional aspects will be set forth in part in the description which follows and, in part, will be apparent from the description, or may be learned by practice of the presented embodiments.

According to one or more embodiments of the present invention, an integrated multilingual consonant pattern search method of extracting and displaying at least one string by inputting a plurality of consonants from a pre-stored original string list is provided.

The integrated multilingual consonant pattern search method may include: initializing a database (DB), and creating the original string list to be searched for; reading the original string list to be searched for and creating a DB of a consonant string to be searched for with respect to respective representative languages; receiving a first consonant pattern that includes a plurality of consonants that are input via a character input unit; searching for a second consonant pattern that matches the first consonant pattern in the DB of the consonant string to be searched for that is created based on a representative language related to the character input unit; creating a search result list that includes at least one consonant string, which includes the searched second consonant pattern; and sorting and displaying the created search result list according to predetermined criteria.

The second consonant pattern may be a pattern that has a same order of character array as the first consonant pattern, but is obtained by extracting and combining a plurality of consonant characters included in the consonant string to be searched for regardless of an interval between the plurality of consonant characters.

The creating of the DB of the consonant string to be searched for with respect to the respective representative languages may include: selecting a representative language that is expressed as a first script from a language-script group, which is pre-classified based on a similarity between alphabet scripts for each language; and converting at least one string, which is expressed as a second script that is included the language-script group, into at least one string, which is expressed as the first script of the representative language.

The creating of the DB of the consonant string to be searched for with respect to respective representative languages may include creating the DB of the consonant string to be searched for, based on a representative language that corresponds to the character input unit connected to the integrated multilingual consonant pattern search apparatus.

The creating of the DB of the consonant string to be searched for with respect to the respective representative languages may include: sequentially reading original strings one by one from the pre-stored original consonant list; converting each character included in the read original strings into a representative character based on a representative character mapping table that is set for the respective representative languages; creating a consonant string by removing a character, other than characters that are included in a first character set which is set for the respective representative languages, from the converted character string; and adding the created consonant string to the DB of the consonant string to be searched for.

The sequentially reading of the original strings, the converting of each character into a representative character, the creating of the consonant string, and the adding of the created consonant string to the DB may be performed with respect to all original strings included in the original string list.

The first character set may include a character set that includes at least one of an initial consonant and a final consonant, or a character set that includes an initial letter.

The created consonant string may be sequentially added to the DB of the consonant string to be searched for, in correspondence with the original string list without additional sorting.

The initializing of the DB, and the creating of the original string list to be searched for may include: creating a root index table in the DB of the consonant string to be searched for; and when m consonant characters are extracted from the consonant string to be searched for, which includes n consonant characters, if a minimum value of $M_{min}$ of a number of consonants m is equal to or greater than 2, creating predetermined index tables, having consonant patterns whose number is at least equal to or greater than 1 and equal to or less than ($M_{min}-1$) as a key, in the DB of the consonant string to be searched for with respect to all characters that belong to the first character set in correspondence with the representative language.

The adding of the created consonant string to the DB of the consonant string to be searched for may include: extracting a combination of all second consonant patterns whose number m of consonants to be extracted is equal to or greater than a minimum number $M_{min}$ and equal to or less than a maximum number $M_{max}$, when m consonant characters are extracted from the consonant string to be searched for, which includes n consonant characters; and adding a pointer, which points at a consonant string that includes the second consonant pattern, to all index tables having a string of the respective extracted second consonant pattern as an index key.

The adding of the pointer may include, if an index table that corresponds to the extracted second consonant pattern is not created, dynamically creating the index table based on the extracted second consonant pattern; and linking the dynamically-created index table that is a sub-index table to the super-index table.

The super-index table is an index table that has an index key in a pattern that is obtained by excluding from the sub-index table a consonant character placed at a last position of an index key in the sub-index table.

With respect to the extracting of the combination of the second consonant patterns, when the m consonant characters are extracted from the consonant string to be searched for that includes the n consonant characters, a maximum value of all consonant patterns that will be extracted without redundancy may be determined as shown below.

$$\text{(Maximum value of a number of cases of a combination of consonant patterns)} = \sum_{m=M_{min}}^{M_{max}} {}_nC_m = \sum_{m=M_{min}}^{M_{max}} \frac{n!}{m!(n-m)!}$$

The receiving of the first consonant pattern that includes the plurality of consonants input via the character input unit may further include limiting an input of all vowel keys via the character input unit.

The searching for of the second consonant pattern that matches the first consonant pattern in the DB of the consonant string to be searched for that is created as a representative language related to the character input unit may include: sequentially reading of all consonant strings included in the DB of the consonant string to be searched for, which is created as a representative language related to the character input unit; and searching for the second consonant pattern by comparing the first consonant pattern to the read consonant string.

The creating of a search result list, which includes at least one consonant string having the searched second consonant pattern, may include creating the search result list by extracting and listing at least one consonant string that includes the searched second consonant pattern, with respect to all consonant strings included in the DB of the consonant string to be searched for.

The searching for of a second consonant pattern that matches the first consonant pattern in the DB of the consonant string to be searched for, which is created as a representative language related to the character input unit may include: referencing the root index table as a current index table and setting a loop variable k to 0; comparing an index key of the current index table to the first consonant pattern; if an index key of the current index table does not match the first consonant pattern, searching for a sub-index table that matches the first consonant pattern by comparing a kth character of the first consonant pattern to a kth character that is a character placed at a last position of an index key of at least one sub-index table connected to the current index table, referencing the searched for sub-index table as the current index table and increasing the loop variable k by 1, and then, recomparing the index key of the current index table to the first consonant pattern; and if an index key of the current index table matches the first consonant pattern, designating the current index table as a search result index table.

The creating of the search result list may include, with regard to the comparing or the recomparing, if the index key of the current index table matches the first consonant pattern, creating as a search result list at least one consonant string that the search result index table points at, and if the index key of the current index table that matches the first consonant pattern is not found, creating a search result list that shows the search result is not present.

According to one or more embodiments of the present invention, a method of creating a character input unit for inputting consonant characters includes: selecting a first character input unit having a predetermined keyboard array; identifying consonant keys, vowel keys, and additional function keys from among a plurality of character keys arrayed on the first character input unit; activating at least one of the consonant keys and the additional function keys and deactivating the other keys; and creating a second character input unit by using the activated keys.

The deactivating of the other keys may include removing the other keys from the identified plurality of keys, or limiting an input of the other keys.

The method may further include changing at least one of a location and a size of the activated consonant key or the activated additional function key, wherein the second character input unit is created to include a key of which at least one of a location and a size is changed.

The changing of the at least one of a location and a size of the activated consonant key or the activated additional function key may include: grouping phonologically-related characters with respect to the consonant; determining a representative character for each group obtained by the grouping; removing characters that belong to the group other than the determined representative character; and changing at least one of a location and a size of a key that represents the determined representative character.

The determining of the representative character for each group obtained by the grouping may include: creating a key mapping table for mapping the consonant key as the representative character; and determining a representative character for each group obtained by the grouping according to the created key mapping table.

The activating of the at least one of the consonant keys and the additional function keys and the deactivating of the other keys may include selectively activating only characters that are used as initial consonants or consonants and vowels that are used as initial letters, from among the identified plurality of keys, according to characteristics of a representative language which the first character input unit belongs to, and selectively deactivating or removing a consonant that is used as a final consonant.

The first character input unit and the second character input unit may be a phonetic keyboard or a virtual keyboard.

According to one or more embodiments of the present invention, an integrated multilingual constant pattern apparatus for extracting and displaying at least one string by inputting a plurality of consonants from among a pre-stored original string list, the integrated multilingual constant pattern apparatus includes: an initialization setting unit for initializing a database (DB), and creating the original string list to be searched for; a consonant string DB creation unit for reading the original string list to be searched for and creating a DB of a consonant string to be searched for with respect to respective representative languages; a character input unit for receiving a first consonant pattern that includes a plurality of consonants to be searched for; a consonant pattern search unit searching for a second consonant pattern that matches the first consonant pattern in the DB of the consonant string to be searched for, based on a representative language related to the character input unit; a search result list creation unit for creating a search result list that includes at least one consonant string, which includes the searched second consonant pattern; and a display unit for sorting and displaying the created search result list according to predetermined criteria.

A second consonant pattern may be a pattern that has a same order of character placement as the first consonant pattern, but is combined by extracting a plurality of consonant characters included in a consonant string to be searched for regardless of an interval between the plurality of consonant characters.

The consonant string DB creation unit may select a representative language that is expressed as a first script from a language-script group, which is pre-classified based on a similarity between alphabet scripts for each language, and convert at least one string, which is expressed as a second script that is included the language-script group, into at least one string, which is expressed as the first script of the representative language.

The consonant string DB creation unit may create the DB of the consonant string to be searched for, based on a representative language that corresponds to the character input unit connected to the integrated multilingual consonant pattern search apparatus.

The consonant string DB creation unit may include: a string reading unit for sequentially reading original strings one by one from the pre-stored original consonant list; a character conversion unit for converting each character included in the read original strings into a representative character based on a representative character mapping table that is set for the respective representative languages; a consonant string creation unit for creating a consonant string by removing a character, other than characters that are included in a first character set which is set for the respective representative languages, from the converted character string; and a string addition unit for adding the created consonant string to the DB of the consonant string to be searched for.

The sequentially reading of the original strings, the converting of each character into a representative character, the creating of the consonant string, and the adding of the created consonant string to the DB may be performed with respect to all original strings included in the original string list.

The first character set may include a character set that includes at least one of an initial consonant and a final consonant, or a character set that includes an initial letter.

The created consonant string may be sequentially added to the DB of the consonant string to be searched for, in correspondence with the original string list without additional sorting.

The initialization setting unit may create a root index table in the DB of the consonant string to be searched for, and when m consonant characters are extracted from the consonant string to be searched for, which includes n consonant characters, if a minimum value of $M_{min}$ of a number of consonants m is equal to or greater than 2, creating predetermined index tables, having consonant patterns whose number is at least equal to or greater than 1 and equal to or less than $(M_{min}-1)$ as a key, in the DB of the consonant string to be searched for with respect to all characters that belong to the first character set in correspondence with the representative language, and the string addition unit may extract a combination of all second consonant patterns whose number m of consonants to be extracted is equal to or greater than a minimum number $M_{min}$ and equal to or less than a maximum number $M_{max}$, when m consonant characters are extracted from the consonant string to be searched for, which includes n consonant characters, and add a pointer, which points at a consonant string that includes the second consonant pattern, to all index tables having a string of the respective extracted second consonant pattern as an index key.

If an index table that corresponds to the extracted second consonant pattern is not created, the string addition unit may dynamically create the index table based on the extracted second consonant pattern, and link the dynamically-created index table that is a sub-index table to the super-index table, and the super-index table may be an index table that has an index key in a pattern that is obtained by excluding from the sub-index table a consonant character at a last position of an index key in the sub-index table.

When the string addition unit extracts the combination of the second consonant patterns and the m consonant characters are extracted from the consonant string to be searched for that includes the n consonant characters, a maximum value of all consonant patterns that will be extracted without redundancy may be determined as shown below.

$$\text{(Maximum value of a number of cases of a combination of consonant patterns)} = \sum_{m=M_{min}}^{M_{max}} {}_nC_m = \sum_{m=M_{min}}^{M_{max}} \frac{n!}{m!(n-m)!}$$

When the first consonant pattern that includes the plurality of consonants is input via the character input unit, an input of all vowel keys via the character input unit may be limited.

The consonant pattern search unit may sequentially read all consonant strings included in the DB of the consonant string to be searched for, which is created as a representative language related to the character input unit, and searches for the second consonant pattern by comparing the first consonant pattern to the read consonant string, and the search result list creation unit may create the search result list by extracting and listing at least one consonant string that includes the searched second consonant pattern, with respect to all consonant strings included in the DB of the consonant string to be searched for.

The consonant pattern search unit may reference the root index table as a current index table and sets a loop variable k to 0, and compare an index key of the current index table to the first consonant pattern, if an index key of the current index table does not match the first consonant pattern, search for a sub-index table that matches the first consonant pattern by comparing a kth character of the first consonant pattern to a kth character that is a character placed at a last position of an index key of at least one sub-index table connected to the current index table, references the searched sub-index table as the current index table and increases the loop variable k by 1, and then, recompare the index key of the current index table to the first consonant pattern, and if an index key of the current index table matches the first consonant pattern, designates the current index table as a search result index table.

With regard to the comparing or the recomparing, if the index key of the current index table matches the first consonant pattern, the search result list creation unit may create as a search result list at least one consonant string that the search result index table points at, and if the index key of the current index table that matches the first consonant pattern is not found, create a search result list that shows the search result is not present.

According to one or more embodiments of the present invention, an of creating a character input unit for inputting consonant characters includes: a character input unit selection unit for selecting a first character input unit having a predetermined keyboard array; a key identification unit for identifying consonant keys, vowel keys, and additional function keys from among a plurality of character keys arrayed on the first character input unit; a key status control unit for activating at least one of the consonant keys and the additional function keys and deactivating the other keys; and a character input unit creation unit for creating a second character input unit by using the activated keys.

The key status control unit may remove the other keys from the identified plurality of keys, or limit an input of the other keys.

The apparatus may further include a changing unit for changing at least one of a location and a size of the activated consonant key or the activated additional function key, wherein the second character input unit is created to include a key of which at least one of a location and a size is changed.

The change unit may group phonologically-related characters with respect to the consonant, determine a representative character for each group obtained by the grouping, remove characters that belong to the group other than the determined representative character, and change at least one of a location and a size of a key that represents the determined representative character.

The determining of the representative character for each group obtained by the grouping may include creating a key mapping table for mapping the consonant key as the representative character, and determine a representative character for each group obtained by the grouping according to the created key mapping table.

The key status control unit may selectively activate only characters that are used as initial consonants or consonants and vowels that are used as initial letters, according to characteristics of a representative language which the first character input unit belongs to, and selectively deactivate or remove a consonant that is used as a final consonant.

The first character input unit and the second character input unit may be a phonetic keyboard or a virtual keyboard.

According to one or more embodiments of the present invention, a non-transitory computer-readable storage medium having stored thereon a computer program, which when executed by a computer, performs the method.

BRIEF DESCRIPTION OF THE DRAWINGS

These and/or other aspects will become apparent and more readily appreciated from the following description of the embodiments, taken in conjunction with the accompanying drawings in which:

FIGS. 14A and 14B respectively illustrate a typical Japanese 10-key keyboard and a 9-key keyboard for inputting consonant characters according to an embodiment of the present invention;

DETAILED DESCRIPTION

Figure 1A:
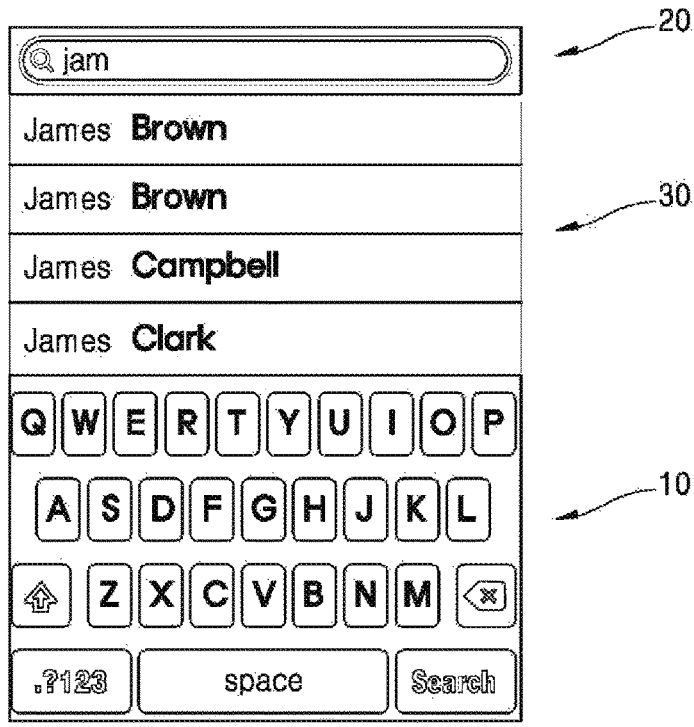
FIGS. 1A and 1B respectively illustrate a result of data searched for by using a conventional word prefix search and a result of data searched for by using a consonant pattern search according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Terms used herein will be briefly described, and the present invention will be described in detail below.

General and widely-used terms have been employed herein, in consideration of functions provided in the present invention, and may vary according to an intention of one of ordinary skill in the art, a precedent, or emergence of new technologies. Additionally, in some cases, an applicant may arbitrarily select specific terms. Then, the applicant will provide the meaning of the terms in the description of the present invention. Accordingly, It will be understood that the terms, used herein, should be interpreted as having a meaning that is consistent with their meaning in the context of the relevant art and will not be interpreted in an idealized or overly formal sense unless expressly so defined herein.

It will be further understood that the terms "comprises," "comprising," "includes," and/or "including," when used herein, specify the presence of components, but do not preclude the presence or addition of one or more other components, unless otherwise specified. Additionally, terms used herein, such as 'unit' or 'module', mean entities for processing at least one function or operation. These entities may be implemented by hardware, software, or a combination of hardware and software.

The present invention will now be described more fully with reference to the accompanying drawings, in which exemplary embodiments of the invention are shown. The invention may, however, be embodied in many different forms and should not be construed as being limited to the embodiments set forth herein. In the description of the present invention, certain detailed explanations of the related art are omitted when it is deemed that they may unnecessarily obscure the essence of the invention. Like numbers refer to like elements throughout the description of the figures.

Figure 1B:
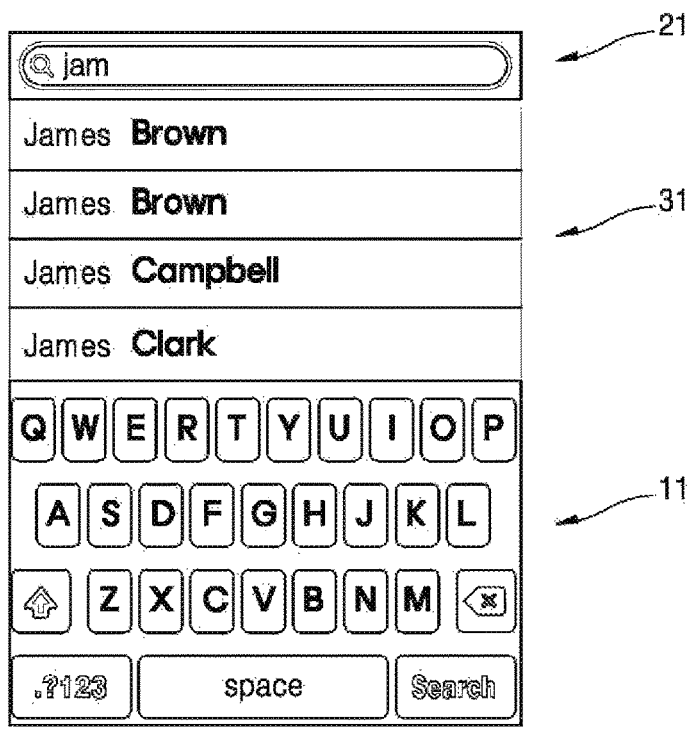

FIGS. 1A and 1B respectively illustrate a result of data that is found by using a conventional word prefix search and a result of data that is found by using a consonant pattern search according to an embodiment of the present invention.

As shown in FIG. 1A, if a search word that is displayed in a data search window 20, for example, if jam is received via a character input unit 10, data that includes the search word as a prefix may be searched for in a pre-constructed database (DB) and displayed in a search result window 30 according to a conventional prefix search method. The prefix search method refers to a method of comparing a string to be searched for to a whole string to be searched for, which is stored in a database (DB), or to characters of respective words in the string to be searched for, which is stored in a DB, from a first character in correspondence with a length of the string to be searched for. Then, if the string to be searched for matches the whole string or the characters of the respective words in the string, the string to be searched for is added to a search result list. However, with regard to the prefix search method, when a user is not aware of a prefix of a string to be searched for or a word in the string, a search may not be performed accurately. For example, if "th" is received as a search word, data starting from "th", such as "Thomas Smith", may be searched for. However, if "sm" is received as a search word, data starting from "sm" may be searched, but data such as "Thomas Smith" may not be searched for.

Additionally, if a certain search word, for example, hom is received, data may be searched for in a pre-constructed DB according to a conventional substring search method, and thus, displayed in the search result window 30. Such a substring search method refers to a method of, if a string to be searched for, which is stored in a DB, includes a string for searching, the string to be searched for, which includes the string for searching, is added to a search result list. For example, if a search word "hom" is received, data that includes "hom", such as "Thomas Smith", may be searched for. If a search word "Gildong" is received, data that includes "길동", such as "홍길동" or "홍 길동", may be searched for. However, with regard to the substring search method, if individual indexing for processing data is not performed in advance, a high-speed search based on sorting may not be performed, and thus, whenever a string is to be searched for, the string to be searched for needs to be compared to all strings stored in the DB one by one. Therefore, a time required for searching for data may be remarkably increased. Accordingly, the substring search method is not appropriate for a large-capacity data search which is employed for an address book or a dictionary. Additionally, when a substring search method is used, a non-consecutive string pattern is not searched for. For example, if "ts" is received as a search word, data such as "Thomas Smith" is not searched for.

Additionally, a search word, for example, ㅎㄱㄷ is input by using a character input unit for inputting Hangul, data that includes the search word, for example, ㅎㄱㄷ may be searched for and displayed according to a conventional initial consonant search method. A principle of an initial consonant search is based on a method of extracting and searching for only initial consonants from all syllables that constitute a string to be searched for, regardless of a vowel or a final consonant.

However, since such an initial consonant search method searches for all data, in which initial consonants match those of a string to be searched for, only based on initial consonants, if a search is performed in a vast amount of database, data that is not desired by a user may be displayed as a result of the searching for. This may cause inconvenience to the user in searching, such that the user may have to perform data filtering again or scroll a screen for several times. For example, if data stored in a phone book or an address book includes a large capacity of, that is, hundreds of or more items, when three initial characters, for example, ㅎㄱㄷ is input to search for a person's name or a company name, tens of search results may be searched for according to cases, and thus, a user may eventually have to scroll a screen for several time to reach a search result which the user is interested in. Accordingly, when a screen is scrolled for several time, a number of times of data filtering may be increased and a lot of time may be unnecessarily taken.

Additionally, if an initial consonant search is to be applied to an English word search, it may be almost impossible to perfectly classify initial consonants from an English word only by using a conventional data search algorithm, without pre-construction of a vast amount of DB that includes information about syllable separation with respect to all English words. Additionally, unless a constant update of DB with regard to newly-coined words that are created continuously is performed, it may be impossible to perform an initial consonant search for English words. Accordingly, only a simple method, such as a method of searching for an initial letter of a word, for example, if "ts" is received as a search word, data that includes "T" and "s" respectively as an initial letter of a first name and a last name is searched for, is implemented for an English word search. In the case of the method of searching for an initial letter of a word, a number of search characters that may be input is less than a number of characters that may be input for an initial consonant search. For example, maximum two characters may be input for a person's name. Accordingly, with regard to a same number of pieces of whole data, much more search results are obtained by using the method of searching for an initial letter of a word, compared to using an initial consonant search. Thus, additional data filtering may be necessary when using the method of searching for an initial letter of a word. For example, if an English full name that is formed of a first name and a last name is searched for in a phonebook, since only two characters may be input at maximum, numerous search results are displayed in a search result window. Accordingly, this may cause inconvenience to a user, since a user may spend a lot of time in scrolling a screen in which a search result window is displayed.

Since there are restraints on data searching in terms of time or a space in a mobile environment that is formed as mobile apparatuses became rapidly widespread, a demand for searching for desired data quickly by using only a minimum key input drastically increasing. In other words, as mobile apparatuses are widely used, a large amount of information about individual persons are accumulated in mobile apparatuses. Thus, since a rapid and accurate data search may not be performed just by using a conventional Korean initial consonant search method or a method of an initial letter of an English word, a demand for easy data search, compared to a conventional technology, is increasing.

According to an embodiment of the present invention, a rapid and accurate search of a vast amount of data may be performed by using the integrated multilingual consonant pattern search method. As shown in FIG. 1B, if a search word (for example, "js" displayed in the search input window 21) is received via the character input unit 11 for inputting a consonant character, data that includes "js" may be rapidly and accurately searched for based on a non-consecutive consonant string (for example, jsbr, jsw, or the like) that is combined by selectively excluding some consonants in a middle of a consecutive consonant string (for example, jmsbrwn), extracted from an original string (for example, James Brown). A search result may be displayed in the search result window 31.

As described above, in the case of a Korean initial consonant search, since a number of initial consonants that may be input is limited to a number of maximum syllables of a string to be searched for or less, if there is a relatively large amount of data to be searched for, an excessive number of search results may be displayed. To solve this problem, a consonant search method which is performed by searching for a final consonant, as well as an initial consonant, was suggested. However, a conventional consonant search method may search for only consonants that are consecutively placed. In other words, according to the conventional consonant search method (hereinafter referred to as a consecutive consonant search), since an order in which each character of a search word is input is not changed, a pattern of consonant characters that are extracted in an arbitrary position and combined (for example, a non-consecutive consonant pattern) may not be searched. That is, a non-consecutive consonant pattern, which is a string of consonants that may become non-consecutive as some consonants in a middle of a string of consecutive consonants are extracted from an original string, may not be searched for by using the conventional consecutive consonant search method. Accordingly, the conventional consecutive consonant search method does not support an initial consonant search method in which a final consonant is excluded and consonants are non-consecutive. Accordingly, a user who expected that a consecutive consonant search would support a familiar initial search may obtain a research result in which an initial search result is not included. Thus, a reliability of a search result may become worse. For example, if a consonant string is extracted from "홍길동" to include initial consonants and final consonants. a consonant string "ㅎㅇㄱㄹㄷㅇ" is obtained. In this case, if "ㅎㄱㄷ" is received as a search word, "홍길동" may not be searched for, while "홍길동" may be found by using a conventional initial consonant search. Instead, data that includes "ㅎㄱㅣ:" that is placed consecutively, for example, "하동" may be searched for. Since "ㅎㄱㅣ:ㅇ" is obtained when a consonant string is extracted from "하동" to include an initial consonant and a final consonant, only data that consecutively includes a consonant string "ㅎㅣㄷ" that corresponds to a search word "ㅎㄱㄷ".

A problem of a conventional consecutive consonant search method, described above, may be applied to an English word search in a same way. For example, if "ts" is received as a search word, though "Thomas Smith" may be searched for by using the conventional consecutive consonant research, "Thomas Smith" may not be searched by using the conventional consecutive consonant search. Instead, only data that includes two consonants consecutively, for example, "Natasha" may be searched for. Additionally, if "tmt" is received as a search word, "Thomas Smith" that includes a consonant string in which consonants are separated with a certain interval in a sequence of "t", "m", and "t", for example, thmssmth may not be found by using a conventional search method. Instead, only data that includes three consonants "t", "m", and "t" consecutively, for example, "Timothy" may be searched for.

In the case of a Korean full name, if a four-character consonant string that is obtained by adding an arbitrary final consonant or only one consonant character to three initial consonants of each syllable is received as a search word, an amount of search results may be greatly reduced. In other words, several names that include identical three initial consonants may be present in a DB in which a search is performed. However, if a final consonant, as well as three initial consonants, is added in a search word, a number of names that include identical three initial consonants and final consonants may be greatly reduced.

For example, assuming that a phonebook DB is present and that, when three initial consonants are input to the phonebook DB, tens of search results appear and a screen needs to be scrolled for several times so as to find a final result, if an arbitrary one final consonant is input in addition to the three initial characters, only a few search results may appear. For example, if "ㅎㄱㄷ" is received as a search word, a plurality of names that include a string pattern of "ㅎㄱㄷ", such as "홍길동" and "황규동", may be searched for. On the contrary, if "ㅎㅣㄷㄷ" is received as a search word, Only a few names that include "홍길동" and other names having a string pattern of "ㅎㄱㄷㅣ:" may be searched for.

In other words, according to an embodiment of the present invention, if a string pattern that is combined by extracting consonants placed in an arbitrary location can be searched for, a user may obtain a search result quickly and accurately while minimizing an input of characters included in an search word desired by the user. In other words, a user may search for or select desired data immediately without having to excessively scroll search results.

As there is a remarkable increase in a social network service (SNS) worldwide owing to improved smartphone functions, as well as a necessity of greatly reducing a number of times for inputting a character and an amount of scrolling so as to maximize data search efficiency in a mobile apparatus, a need for solving a problem of limits to data search, caused by multi-language uses, has recently emerged.

Representative examples are persons' names or company names. As users may easily expand their personal relationship or business by using a smartphone or an SNS, cases, in which persons' names or company names stored in a smartphone are in a user's mother tongue or other countries' languages, are gradually increasing. A most representative case is when a user's mother tongue is used together with English that is an international language. An efficient data search method of using a pattern that is combined based on an arbitrary location of characters in a string, has not been introduced at all, with respect to main world languages such as various European languages, or Chinese or Japanese in Asia, as well as English that is an international official language.

For example, by using a conventional search method, even if "tms" is received as a search word, "Thomas Smith" is not searched for. By using a conventional search method, even if "zg" is received as a search word, "Žiga" is not searched for. Even if "さま" is received as a search word, "あさだまお" is not searched for. Even if "auv" is received as a search word, "艾尚真" is not searched for. Additionally, by using a conventional search method, even if "ПЧКС" is received as a search word, "Пётр Чайко́вский" is not searched for.

Since cases in which multi-languages are used in a mobile apparatus are gradually increasing according to a recent trend of globalization, a need for a search method by which data can be searched for quickly, efficiently, conveniently, and consistently for each language with respect to main world languages, as provided in the present invention, is increasing.

Figure 2:
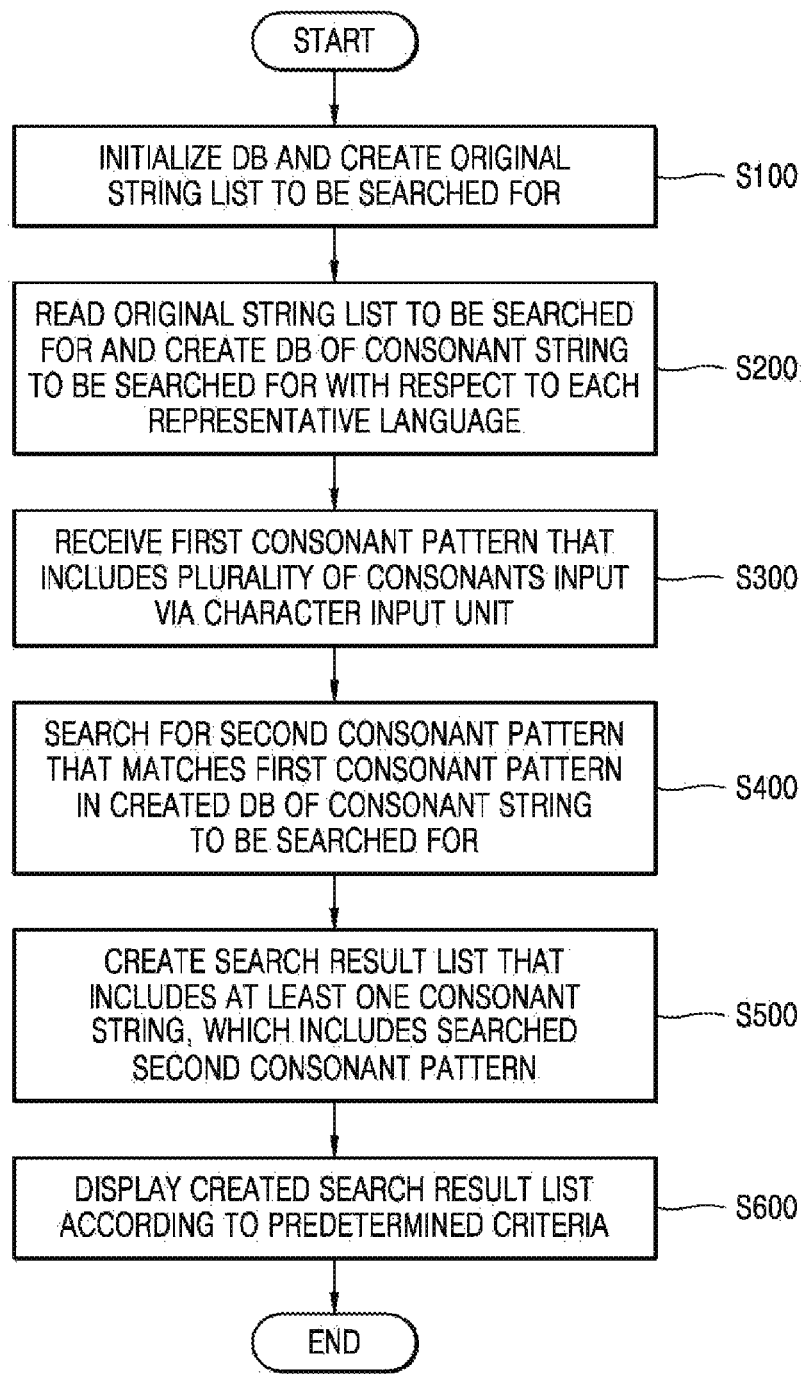
FIG. 2 is a flowchart of an integrated multilingual consonant pattern search method according to an embodiment of the present invention.

FIG. 2 is a flowchart of an integrated multilingual consonant pattern search method according to an embodiment of the present invention.

According to an embodiment of the present invention, the integrated multilingual consonant pattern search method of extracting and displaying at least one string by inputting a plurality of consonants from a pre-stored original string list, the method including initializing a DB and creating the original string list to be searched for in operation S100, reading the original string list to be searched for and creating a DB of a consonant string to be searched for with respect to each representative language in operation S200, receiving a first consonant pattern that includes a plurality of consonants input via the character input unit in operation S300, searching for a second consonant pattern that matches the first consonant pattern in the created DB of a consonant string to be searched for, based on a representative language related to the character input unit in operation S400, creating a search result list that includes at least one consonant string, which includes the searched for second consonant pattern in operation S500, and sorting and displaying the created search result list according to predetermined criteria in operation S600.

According to an embodiment of the present invention, the second consonant pattern is a pattern that has a same order of character array as the first consonant pattern, but is obtained by extracting and combining a plurality of consonant characters included in the consonant string to be searched for regardless of an interval between the plurality of consonant characters.

According to an embodiment of the present invention, a plurality of characters may be received from a user, and thus, an original character list included in a pre-constructed DB may be efficiently searched for. In other words, just by inputting initial or final consonants, only a few strings may be displayed on a screen without having to make the screen scroll too much. According to an embodiment of the present invention, a consonant string may generally be a string that includes a set of initial or final consonants, for example, a string that includes a plurality of initial or final consonants.

According to an embodiment of the present invention the initializing of the DB and the creating of the original string list to be searched for in operation S100 may be an initialization step, and may include initializing of a DB that includes an original string list to be searched for. The initializing of the DB may refer to preparation for data search, such as initializing of various variables (for example, setting of an initial variable) or identification of items included in the DB by using metadata. In operation S100, the original string list to be searched for may be created. All or a part of original strings may be randomly extracted from the DB that includes the original string, and listed as the original string list.

According to an embodiment of the present invention, the reading of the original string list to be searched for and the creating of the DB of the consonant string to be searched for with respect to each representative language in operation S200 may include classifying the original string for each language in which the original string is expressed and creating the DB of the consonant string to be searched for based on the language for which the original string is classified.

According to an embodiment of the present invention, the creating of the DB of the consonant string to be searched for with respect to the respective representative languages in operation S200 includes selecting a representative language that is expressed as a first script from a language-script group, which is pre-classified based on a similarity between alphabet scripts for each language and converting at least one string, which is expressed as a second script that is included the language-script group, into at least one string, which is expressed as the first script of the representative language.

In other words, an integrated consonant search may be performed for an individual language-character group, by selecting a representative language based on a specific script (or character) with respect to a language-script group that has a similarity between alphabet scripts for each language and converting all strings that are expressed as a specific script (or character) of a language (ca), which belongs to a predetermined language-script group (for example, Catalan{ca-ES} in Table 1 shown below) into a string which is expressed in a specific character of the corresponding representative language (for example, English{Latin} in Table 1 shown below).

TABLE 1

| Representative {specific character} | Language {Language tag} - Combination of Characters |
|---|---|
| Korean {Hangul} | Korean{ko-KR} |
| English{Latin} | Catalan{ca-ES}, Croatian{hr-HR}, Czech{cs-CZ}, Danish{da-DK}, Dutch{nl-NL}, English{en-US}, Australian English{en-AU}, Canadian English{en-CA}, British English{en-GB}, Estonian{et-EE}, Finnish{fi-FI}, Flemish{nl-BE}, French{fr-FR}, Canadian French{fr-CA}, Swiss French{fr-CH}, German{de-DE}, Swiss German{de-CH}, Hawaiian{haw}, Hungarian{hu-HU}, Icelandic{is-IS}, Indonesian{id-ID}, Italian{it-IT}, Latvian{lv-LV}, Lithuanian{lt-LT}, Malay{ms-MY}, Norwegian{nb-NO}, Polish{pl-PL}, Brazilian Portuguese{pt-BR}, Portuguese{pt-PT}, Romanian{ro-RO}, Serbian(sr)-Latin, Slovak{sk-SK}, Spanish{es-ES}, Swedish{sv-SE}, Turkish{tr-TR}, Vietnamese{vi-VN} |
| Japanese{Hirakana} | Japanese{ja-JP}-Hirakana, Japanese{ja-JP}-Katakana, Japanese{ja-JP}-Romaji |
| Chinese{Hanzi} | Simplified Chinese{zh-Hans}-Pinyin, Traditional Chinese{zh-Hant}-Pinyin, Traditional Chinese{zh-Hant}-Zhuyin |
| Russian{Cyrillic} | Bulgarian(bg-BG), Macedonian(mk-MK), Russian(ru-RU), Serbian(sr)-Cyrillic, Ukrainian(uk-UA) |
| Arabic | Arabic{ar} |
| Cherokee | Cherokee{chr} |
| Greek | Greek{el-GR} |
| Hebrew | Hebrew{he-IL} |

TABLE 1-continued

| Representative {specific character} | Language {Language tag} - Combination of Characters |
|---|---|
| Hindi | Hindi{hi} |
| Tamil | Tamil{ta} |
| Thai | Thai{th-TH} |
| Tibetan | Tibetan{bo} |

In the description of the specification, "a script or a character" may refer to an input technique via an input device, as well as a specific alphabet script. Accordingly, one "language-script combination" may correspond to one character input unit one by one. For example, Romaji, Pinyin, and Zhuyin, shown in Table 1, represent an input method.

According to an embodiment of the present invention, the creating of the DB of the consonant string to be searched for with respect to each representative language in operation S200 may include creating the DB of the consonant string to be searched for, based on a representative language that corresponds to the character input unit connected to the integrated multilingual consonant pattern search apparatus. In other words, with respect to a representative language that does not correspond to any keyboard connected to an input apparatus such as a mobile apparatus according to a need by a user, since a keyboard that may be used for the representative language is not present even if a DB of a consonant string to be searched for is created, the representative language cannot be used for searching for a consonant string. Accordingly, it may be desirable not to create a DB for a representative language that does not correspond to any keyboard.

For example, with respect to a representative language in an arbitrary language-script combination, if a character input unit is a keyboard that belongs to a corresponding language-script group and is a typical national standard or conventional keyboard to which input is not limited or mapped to be consonant-dedicated, a conversion of a key input character for receiving only an input of a consonant character set, which is defined for a corresponding representative language, may be performed by disabling an input of all vowel keys, grouping phonologically-related characters with respect to all consonant keys that do not belong to a consonant character set defined to correspond to the corresponding representative language, and mapping characters in each group to one representative character that belongs to the consonant character set, instead of performing a conversion according to a conventional input method that corresponds to a corresponding keyboard. However, the disabling of the input of all the vowel keys are not applied to an initial letter search that may include some vowels as well as consonants. The mapping of characters in each group to one representative character may be applied to some vowels.

When a language-script (or character) combination of a representative language is {Korean-Hangul}, if a character input unit is a keyboard that belongs to a {Korean-Hangul} language-script group, and a typical national standard or conventional keyboard to which input is not limited or mapped to be consonant-dedicated, an input of only a specific consonant character set, shown in Table 3, may be received by disabling an input of all vowel keys, receiving an input of only a single consonant without combining a twin consonant and a compound consonant, and if a final consonant key is additionally present, mapping the final consonant key with a corresponding initial consonant.

When a language-script combination of a representative language is {English-Latin}, if a character input unit is a keyboard that belongs to a {English-Latin} language-script group, and a typical national standard or conventional keyboard to which input is not limited or mapped to be consonant-dedicated, only a specific consonant character set, shown in Table 5, may be input by disabling an input of all vowel keys and mapping all consonant key characters according to a representative character mapping table, as shown in an example in Table 4.

When a language-script combination of a representative language is {Japanese-Hirakana}, if a character input unit is a typical Japanese Romaji keyboard and a keyboard to which input is not limited or mapped to be consonant-dedicated, only a specific consonant character set, shown in Table 7, may be input by disabling an input of all vowel keys and mapping all consonant key characters according to a representative character mapping table, as shown in an example in Table 4. An arbitrary column may be selected from 50 characters, included in a Japanese standard character set, and used as a representative character. Tables 7 and 19 show an embodiment in which a column あ of harakana is selected.

When a language-script combination of a representative language is {Japanese-Hirakana}, if a character input unit is a Japanese 10-key keyboard generally used for a feature phone or a smartphone in Japan, as shown in FIG. 14, and a keyboard to which input is not limited or mapped to be consonant-dedicated, only an input of a specific consonant character set, shown in Table 7, may be received by disabling an input of all vowel keys and mapping all consonant key characters that is input based on combination of keys according to a representative character mapping table, as shown in an example in Table 6. An arbitrary column may be selected from 50 characters, included a Japanese standard character set, and used as a representative character. According to an embodiment of the present invention, Tables 6 and 7 show a case in which a column あ of harakana is selected.

When a language-script combination of a representative language is {Chinese-Hanzi}, if a character input unit is a standard Chinese Pinyin keyboard, each alphabet key is input as an initial letter without having to convert Pinyin into Hanzi. With respect to three consonants Zh, Ch, and Sh that may not be input by using one alphabet key, [V], [I], and [U] keys may be respectively input according to a relationship shown below.

|  | Character to be searched for | | |
|---|---|---|---|
|  | Zh | Ch | Sh |
| Actual key input | V | I | U |

The consonants Zh, Ch, Sh respectively may be mapped arbitrarily with [V], [I], and [U] keys. However, according to an embodiment of the present invention, such mapping relationship shows a case in mapping of corresponding keys is provided in the conventional double Pinyin keyboard.

When a language-script combination of a representative language is {Chinese-Hanzi}, if a character input unit is a conventional Chinese Zhuyin keyboard and an input thereto is not limited or mapped to be consonant-dedicated, only an input of a specific consonant character set, shown in an example of in Table 9, may be received by disabling an input of all vowel keys that are not included in Table 21 and mapping all consonant key characters and some representative vowel keys included in Table 21 according to the Table 21, without converting conventional Zhuyin into Hanzi.

When a language-script combination of a representative language is {Russian-Cyrillic}, if a character input unit is a keyboard that belongs to a {Russian-Cyrillic} language-character group and is a typical national standard or conventional keyboard, only an input of a specific consonant character set shown in FIG. 13 may be received by disabling an input of all vowel keys and, if necessary, mapping representative characters according to a representative character mapping table, shown in FIG. 12 as an embodiment. Table 12 shows an embodiment in which a capital letter is determined as a representative character, and a "Г" (Ge Upturn) character is mapped as "Г" (Ge)

According to an embodiment of the present invention, the integrated multilingual consonant pattern search method may include the receiving of the first consonant pattern that includes the plurality of consonants, which are input via the character input unit, in operation S300. The character input unit may include a phonetic keyboard or a virtual keyboard. A user may input at least one search word via the character input that corresponds to language to be searched for. The at least one search word may be at least one consonant character. The inputting of the plurality of consonants by a user, in operation S300, may correspond to receiving of a certain consonant string that is formed according to an order in which the plurality of consonants are input. For example, if a user inputs consonant characters in an order of English characters "j" and "s", a consonant string received according to a user input is "js". Hereinafter, a certain consonant string may be referred to as a consonant pattern. A first consonant pattern may include a consonant string that includes a plurality of consonants which are arranged in parallel in a certain direction in accordance with an order in which the plurality of consonants are received according to a user input. A certain direction may be a direction from left to right, a direction from right to left, a direction from up to down, or a direction from down to up.

According to an embodiment of the present invention, the searching for of the second consonant pattern that matches the first consonant pattern in the created DB of the consonant string to be searched for, based on a representative language related to the character input unit, in operation S400, may include searching for a second consonant pattern that has a pattern identical or similar to the first consonant pattern in the DB of the consonant string to be searched for, which is created based on a language that corresponds to the character input unit.

According to an embodiment of the present invention, the creating of the search result list that includes at least one consonant string having a searched for second consonant pattern, in operation S500, may include extracting at least one consonant string having the searched for second consonant pattern from the DB of the consonant string to be searched for, based on language that corresponds to the character input unit, and creating a search result list by listing at least one of the extracted consonant string.

According to an embodiment of the present invention, the sorting and displaying of the created search result list according to the predetermined criteria, in operation S600, may include arranging the search result list so that an original string that corresponds to a consonant string, which is searched for according to an order in which the second consonant pattern is searched for in the DB of the consonant string to be searched for, is ranked high, and displaying the search result list.

According to an embodiment of the present invention, the second consonant pattern may be a pattern that has a same order of character array as the first consonant pattern, but is obtained by extracting and combining a plurality of consonant characters included in the consonant string to be searched for regardless of an interval between the plurality of consonant characters. For example, "thmssmth" may be obtained from an original string "Thomas Smith" as a consonant string to be searched for. A second consonant pattern that is combined by extracting consonant characters regardless of an array interval therebetween, such as "tm", "tmt", "tmth", "tsmth", or the like, may be obtained from "thmssmth" which is the consonant string to be searched for. For example, according to an embodiment of the present invention, if "tm" is input as a search word (or a first consonant pattern), a search result list, which includes an original string "Thomas Smith" having a consonant string "thmssmth" that includes a second consonant pattern identical to the first consonant pattern (for example, "tm"), may be created and displayed.

Figure 3:
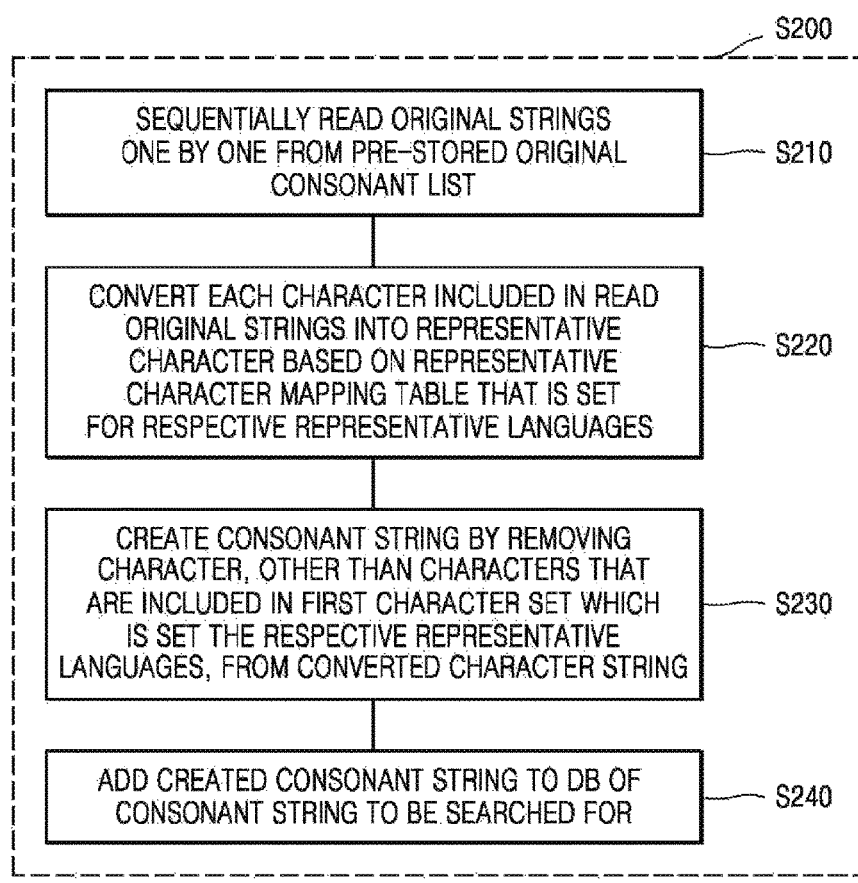
FIG. 3 is a flowchart of a database (DB) of a consonant string, which is to be searched for with respect to each representative language from an original language list according to an embodiment of the present invention.

FIG. 3 is a flowchart of a method of creating a DB of a consonant string, which is to be searched for with respect to each representative language from an original language list, according to an embodiment of the present invention.

According to an embodiment of the present invention, the creating of the DB of the consonant string to be searched for with respect to the respective representative languages, in operation S200, may sequentially reading original strings one by one from the pre-stored original consonant list in operation S210, converting each character included in the read original strings into a representative character based on a representative character mapping table that is set for the respective representative languages in operation S220, creating a consonant string by removing a character, other than characters that are included in a first character set which is set for the respective representative languages, from the converted character string in operation S230, and adding the created consonant string to the DB of the consonant string to be searched for in operation S240. Additionally, the sequentially reading of the original strings in operation S210, the converting of each character into a representative character in operation S220, the creating of the consonant string in operation S230, and the adding of the created consonant string to the DB in operation S240 may be performed with respect to all original strings included in the original string list. According to an embodiment of the present invention, the first character set may be referred to as a "consonant character set" hereinafter, for convenience of description.

According to an embodiment of the present invention, the DB of consonant strings to be searched for each representative language may be created by performing the sequentially reading of respective original string from the original consonant list that are pre-stored in a storage apparatus connected to an integrated multilingual consonant pattern search apparatus in operation S210, the converting of each character included in a corresponding original string into a representative character based on a representative character mapping table that is set for a representative language which is to be used to create a DB of the consonant string to be searched for in operation S220, the creating of the consonant string by removing characters that are not included in the first character set which is defined differently for each representative language, from the converted character string in operation S230, and the adding of the created consonant string to the DB in operation S240. Operations S210 through S240 may be performed repeatedly until an end of the original string list is reached.

According to an embodiment of the present invention, in operation S230, the first character set (or the consonant character set) may not necessarily be a consonant, and may be a set of arbitrary characters. For example, the consonant set may include a character set of initial consonants and final consonants, a character set of only initial consonants, or a character set of initial letters. According to such expandability and generality, the consonant character set may be commonly and comprehensively applied to an arbitrary photogram-based language, a corresponding keyboard, and an input method. In other words, according to an embodiment of the present invention, the first character set may include a character set that includes at least one of an initial consonant and a final consonant, or a character set that includes an initial letter.

According to an embodiment of the present invention, a DB is created according a sequential-addition algorithm, as shown below.

| Original String List | DB Creation → | Created DB (Not sorted) | | |
|---|---|---|---|---|
| | | Sequence No. | Consonant String | Original String |
| James Smith | | 1 | jmssmth | James Smith |
| Thomas Smith | | 2 | thmssmth | Thomas Smith |
| Charlie Brown | | 3 | chrlbrwn | Charlie Brown |
| Žiga | | 4 | zg | Ziga |

In operations S220 and S230, in a case when a language-script combination of a representative language is {Korean-Hangul}, a representative character mapping table shown in FIG. 2 and a consonant string set shown in FIG. 3 may be pre-defined.

TABLE 2

| Original Initial Consonant | ㄲ | ㄸ | ㅃ | ㅆ | ㅉ | | | | | | | |
|---|---|---|---|---|---|---|---|---|---|---|---|---|
| Representative Character | ㄱ | ㄷ | ㅂ | ㅅ | ㅈ | | | | | | | |
| Original Final Consonant | ㄲ | ㄳ | ㄵ | ㄶ | ㄺ | ㄻ | ㄼ | ㄽ | ㄾ | ㄿ | ㅀ | ㅄ | ㅆ |
| Representative Character | ㄱ | ㄱ | ㄴ | ㄴ | ㄹ | ㄹ | ㄹ | ㄹ | ㄹ | ㄹ | ㄹ | ㅂ | ㅅ |

TABLE 3

| Consonant Character Set (14 initial characters in total) | ㄱㄴㄷㄹㅁㅂㅅㅇㅈㅊㅋㅌㅍㅎ |
|---|---|

All final consonants may be mapped with initial consonants, including mappings shown in Table 2, so that all characters which belong to the consonant character set may be unified as an initial character. Additionally, a final compound consonant may be obtained by arbitrary selecting and mapping two consonants from among consonants that constitute a compound consonant in Table 2. A final compound consonant may be removed, instead of being mapped. Additionally, as necessary, a silent sound "ㅇ" may be removed from Table 3.

Figure 4:
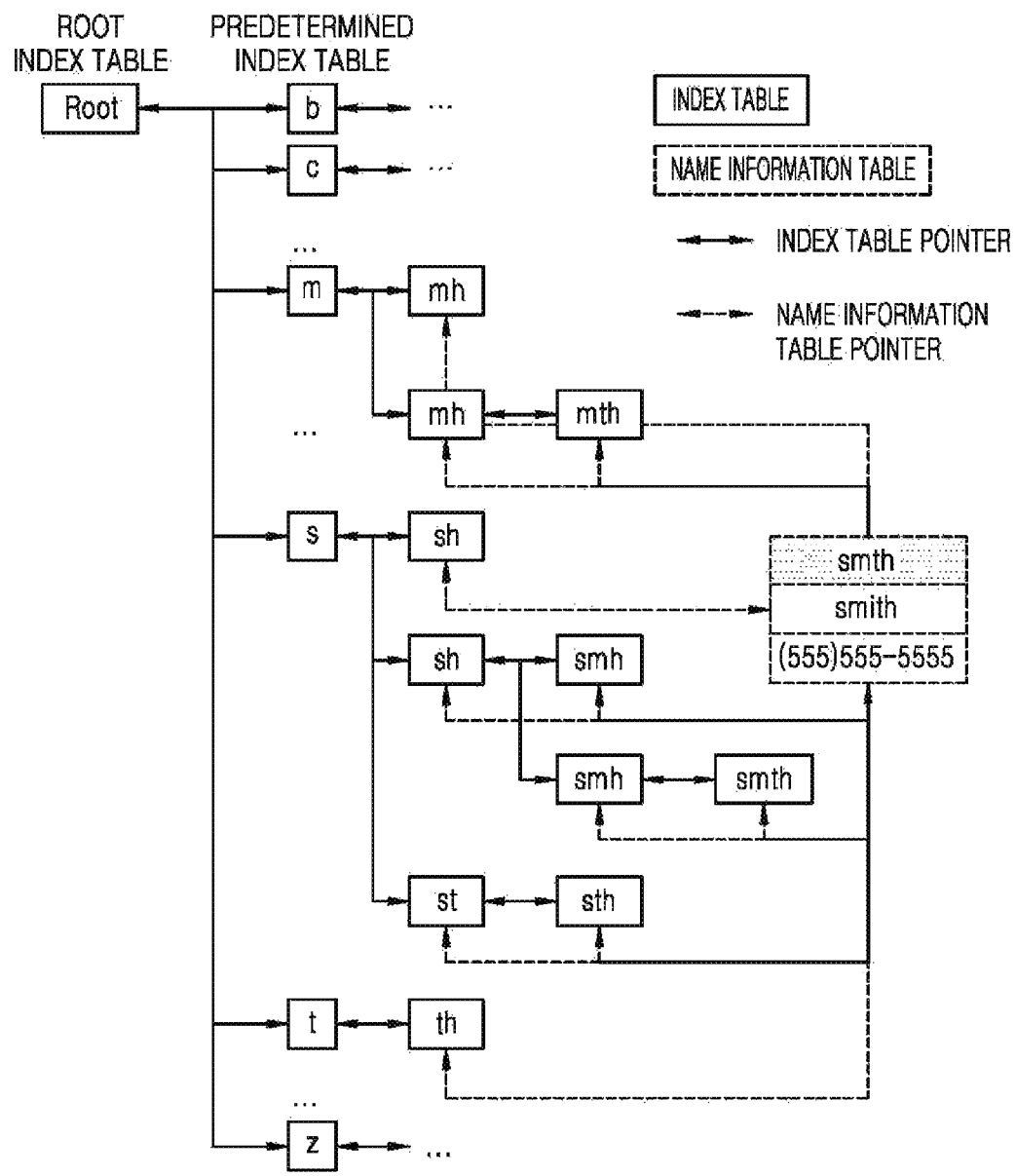
FIG. 4 illustrates a method of adding and searching for data by using linkage of a plurality of created index tables according to an embodiment of the present invention.
Figure 5:
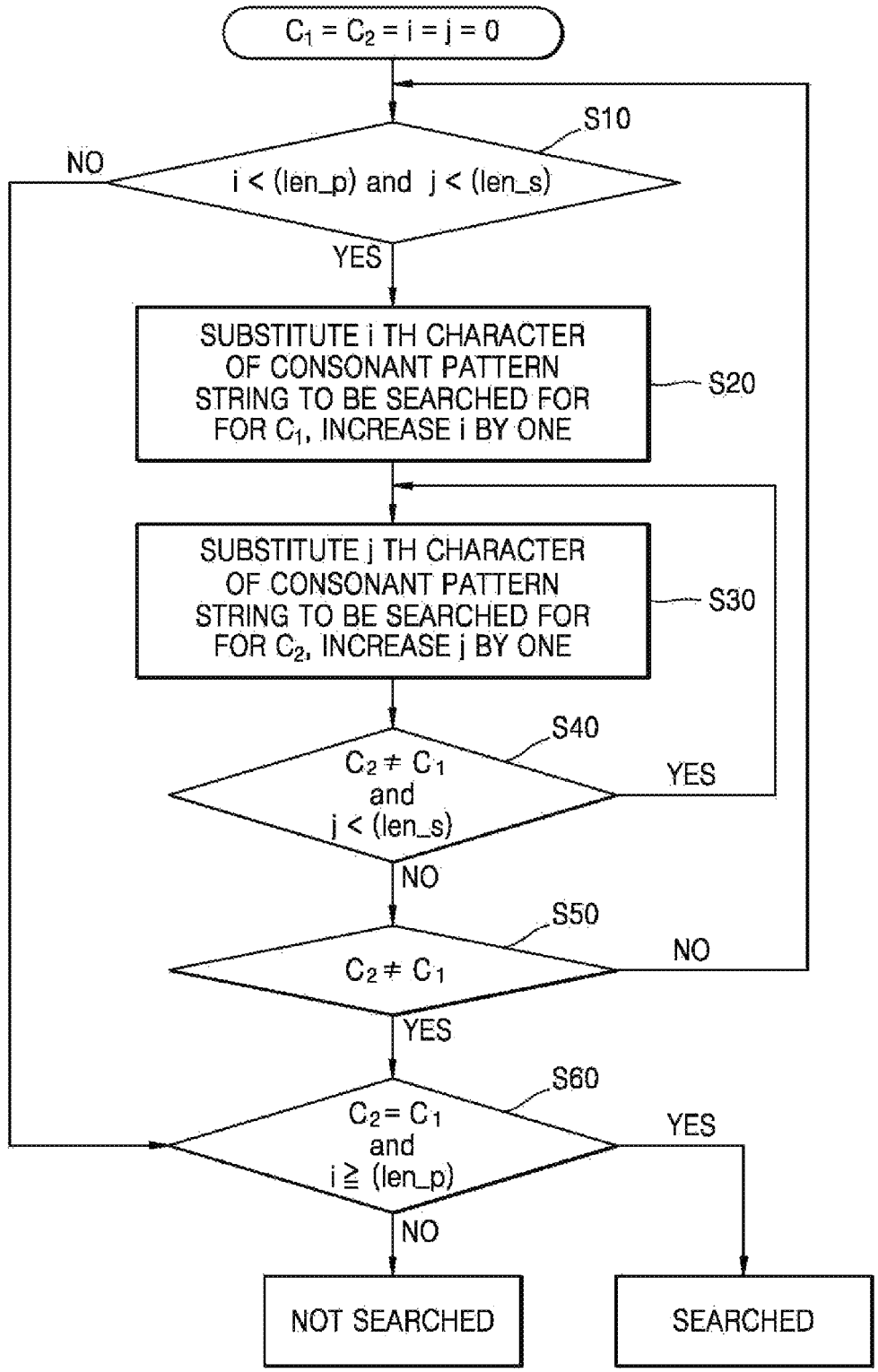
FIG. 5 is a flowchart of a consonant pattern comparison algorithm according to an embodiment of the present invention.

In operation S220 and S230, in a case when a language-script combination of a representative language is {English-Latin}, a representative character mapping table based on a "unicode normalization form D: standard shown in FIG. 4 and a consonant string set shown in FIG. 5 may be pre-defined.

TABLE 4

| Original Character | bcdfghjklmnpqrstvwxzÇÐÑÞßçðñþ |
|---|---|
| Representative Character | BCDFGHJKLMNPQRSTVWXZCDNTSCDNT |
| Original Character | ĆćĈĉĊċČčĎďĐđĜĝĞğĠġĢģĤĥĦħĴĵĶķĹĺĻļĽľ |
| Representative Character | CCCCCCCCDDDDGGGGGGGG HHHHJJKKQLLLLLLLLLL |
| Original Character | ŃńŅņŇňʼnŊŋŔŕŖŗŘřŚśŜŝŞşŠšŢţŤťŦŧŴŵŹźŻżŽžſŞşŢţ |
| Representative Character | NNNNNNNNNRRRRRRSSSSSSSS TTTTTTWWZZZZZZSSSTT |

TABLE 5

| Consonant Character Set (20 characters in total) | BCDFGHJKLMNPQRSTVWXZ |
|---|---|

Figure 6:
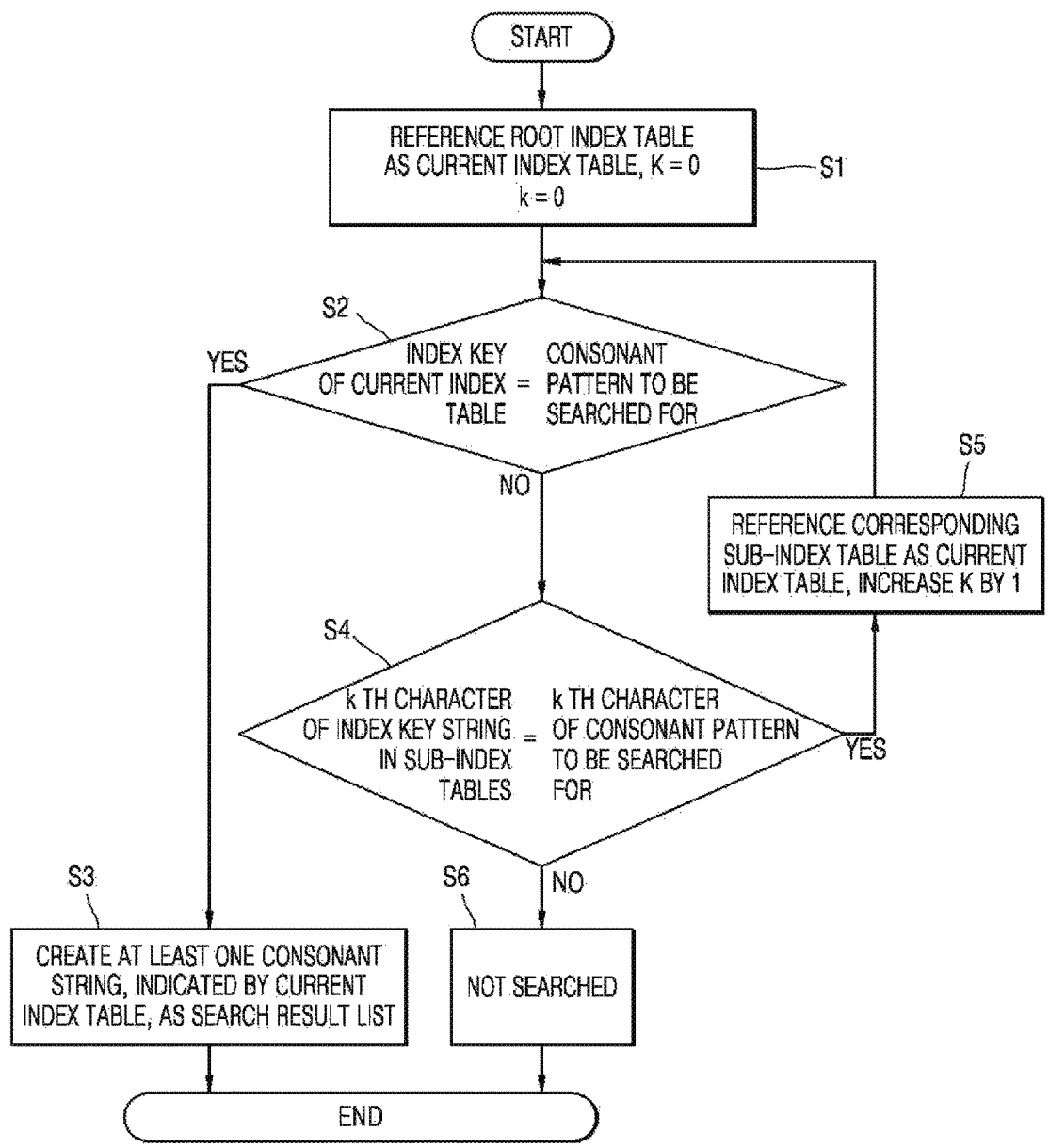
FIG. 6 is a flowchart of an algorithm for an indexed search for data by using a plurality of index tables according to an embodiment of the present invention.
Figure 7:
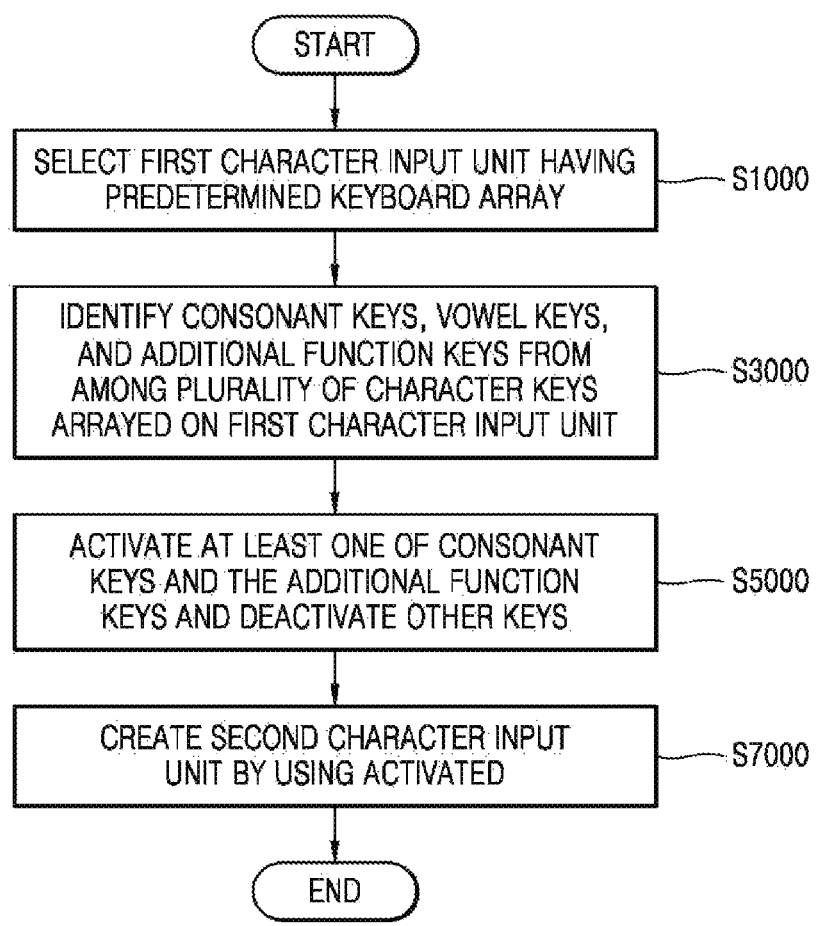
FIG. 7 is a flowchart of a method of creating a character input unit for inputting consonant characters according to an embodiment of the present invention.

In operation S220 and S230, in a case when a language-script combination of a representative language is {Japanese-Hirakana}, a representative character mapping table shown in FIG. 6 and a consonant string set shown in FIG. 7 may be pre-defined.

TABLE 6

| Original hirakan | かがきぎくぐけげこごさざししじすずせぜそぞただちぢっつづてでとど |
| --- | --- |
| Representative Character | かがかがかがかがかがさざさざさざさざさざただただただただただただ |
| Original hirakana | なにぬねのはばぱひびぴふぶぷへべぺほぼぽまみむめもやゆよらりるれろんヴ |
| Representative Character | なななななはばぱはばぱはばぱはばぱはばぱまままままらららららんは |
| Original katakana | カガキギクグケゲコゴサザシジスズセゼソゾタダチヂッツヅテデトド |
| Representative Character | かがかがかがかがかがさざさざさざさざさざただただただただただただ |
| Original katakana | ナニヌネノハバパヒビピフブプヘベペホボポマミムメモラリルレロンヴヵヶ |
| Representative Character | なななななはばぱはばぱはばぱはばぱはばぱまままままらららららんはかか |

TABLE 7

| Consonant Character Set (13 characters in total) | かがさざただなはばぱまらん |
| --- | --- |

TABLE 9

| Consonant Character Set (26 characters in total) | ABCDEFGHIJKLMNOPQRSTUVWXYZ |
| --- | --- |

Each representative character may represent vowels that sound "a" (あ/ア), "i" (い/イ), "u" (う/ウ), "e" (え/エ), or "o" (お/オ) and all characters that have an initial or final consonant identical to a representative character.

An arbitrary column (段) may be selected from 50 characters included a Japanese standard character set, and used as a representative character. However, Tables 7 and 19 show an embodiment in which a column あ of harakana is selected. In this case, for example, a character a は may represent ten characters such as hirakana characters は, ひ, ふ, へ, and ほ and katakana characters ハ, ヒ, フ, ヘ, and ホ, and, a character ん may represent two characters such as ん and ン. Additionally, as necessary, if only an initial consonant search is to be performed, a final consonant ん may be removed from Tables 6 and 7.

Figure 8:
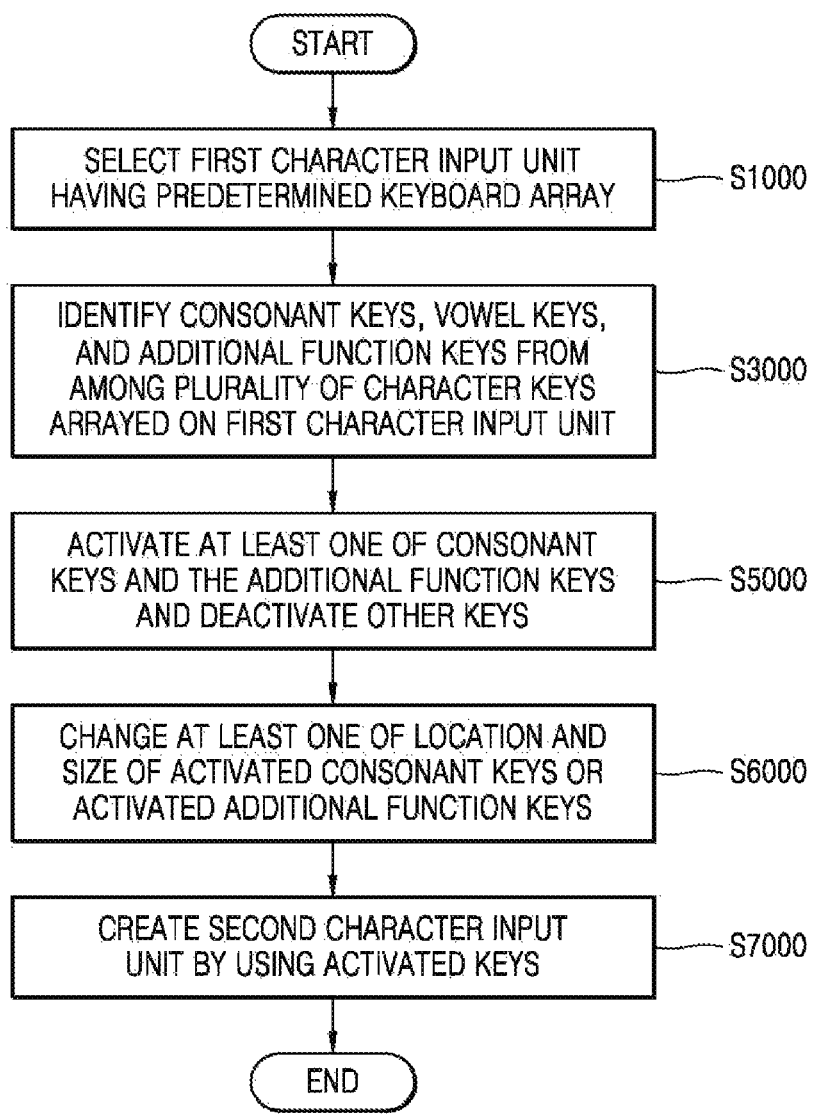
FIG. 8 is a flowchart of a method of creating a character input unit that includes a key that is changed according to an embodiment of the present invention.

In operation S220 and S230, in a case when a language-script combination of a representative language is {Chinese-Hanzi}, a representative character mapping table shown in FIG. 8 and a consonant string set shown in FIG. 9 may be pre-defined.

Considering that a Chinese character is formed of a combination of an initial consonant and a final consonant, instead of a combination of a consonant and a vowel and that it may be also required to search for a Chinese character that is formed of only a final consonant without an initial character if a Chinese character is converted, and in order to search for a search word by using a minimum key input, with respect to a representative language in a combination of {Chinese-Hanzi}, a search for an initial letter may be performed by converting a first pronunciation of each Hanzi character into a Pinyin string, and then, searching for an initial letter of a corresponding Pinyin string, that is, a first Pinyin character.

As shown in Table 10, a Pinyin character that may be an initial letter includes a total of 26 characters such as 21 consonants and 5 vowels. Three consonants such as "Zh", "Ch", and "Sh" are respectively formed of one phoneme but may be written with two English characters. In this case, if the initial letter is selected, a phoneme "Zh" may not be differentiated from a phoneme "Z" by using an initial "Z". Accordingly, in order to prevent this, as shown in Table 11, characters "V", "I", and "U" that cannot be an initial letter of each syllable according to a Pinyin standard may be

TABLE 8

| Hanzi Character Set and Code Range | Unicode Standard |
| --- | --- |
| | CJK Unified Ideographs (Unified Chinese Characters of Chinese, Japanese, and Korean) |
| | Code range: U + 4E00 ~ U + 9FCC |
| | CJK Unified Ideographs Extension A (Extension A of Unified Chinese Characters of Chinese, Japanese, and Korean) |
| | Code range: U + 3400 ~ U + 4DB5 |
| Mapping Principle | Mapping each Hanzi character and a first phoneme of a Pinyin string of a first pronunciation that corresponds to each Hanzi character according to [Table 10] and converting the first phonemes into a representative character |
| Main mapping examples | |

| | Hanzi | Unicode | Pinyin of each pronunciation | First phoneme of a first pronunciation | Representative Character |
| --- | --- | --- | --- | --- | --- |
| | 林 | U + 6797 | lín | L | L |
| | 禹 | U + 79B9 | yǔ | Y | Y |
| | 偶 | U + 5076 | ǒu | O | O |
| | 真 | U + 771F | zhēn | Zh | V |
| | 尚 | U + 5C1A | shàng, cháng | Sh | U | respectively mapped with the three consonants "Zh", "Ch", and "Sh". The consonants "Zh", "Ch", and "Sh" may be arbitrarily mapped with the characters "V", "I", and "U". However, according to an embodiment of the present invention, the consonants "Zh", "Ch", and "Sh" may use same mapping as a conventional double Pinyin keyboard.

TABLE 10

| B | P | M | F | | |
|---|---|---|---|---|---|
| D | T | N | L | | |
| G | K | H | | | |
| J | Q | X | | | |
| Zh | Ch | Sh | R | | |
| Z | C | S | | | |
| A | O | E | W | | Y |

TABLE 11

| Writing of Initial Character of Original Pinylin | Zh | Ch | Sh |
|---|---|---|---|
| Representative Character | V | I | U |

As described above, by unexceptionally corresponding one Hanzi character to one English alphabet one to one with respect to all Hanzi characters by converting Hanzi into a Pinyin initial letter and using the mapping shown in Table 11, an integrated search may be performed on a representative language of {Chinese-Hanzi} on a basis of one character for one consonant, like all other representative languages. Tables 8 and 9 show an embodiment in which a Pinyin capital letter is set as a representative character, and as necessary, a small letter may be set as a representative character.

In operation S220 and S230, in a case when a language-script combination of a representative language is {Russian-Cyrillic}, a representative character mapping table shown in FIG. 12 and a consonant string set shown in FIG. 13 may be pre-defined.

TABLE 12

| Original String | Small letter | [(U + 0490) | [(U + 0491) |
|---|---|---|---|
| Representative Character | Capital letter | [(U + 0413) | [(U + 0413) |

TABLE 13

| Consonant Character Set (26 characters in total) | ЂГЅЈЊЋЌЏЦБВГДЖЗКЛМНПРСТФХЦЧШЩ |
|---|---|

Table 12 shows a case when a capital letter is set as a representative character, and a "Ґ" (Ge Upturn) character that is used only in Ukrainian and is difficult to array on a keyboard is mapped as a "Г" (Ge) character, according to an embodiment of the present invention. Table 13 a case when all consonants in Russian are included and a Ukrainian character "Ґ" is excluded, according to an embodiment of the present invention.

According to an embodiment of the present, the created consonant string may be sequentially added to the DB of the consonant string to be searched for, in correspondence with the original string list without additional sorting.

For example, a simplest algorithm (or method) that may be employed in operation S240 may be a sequential-addition algorithm that does not include additional index, and thus, may take up a smallest storage space in the DB, and have a lowest search speed. A sequential-addition method may refer to a method of sequentially adding created consonant strings to a DB without particular array. According to an embodiment of the present invention, since the sequential-addition method is performed by adding only created consonant strings to the DB, and is not dependent on but completely independent from a particular language or character, the sequential-addition method may be commonly and comprehensively applied to arbitrary phonogram-based languages.

According to an embodiment of the present invention, the initializing of the DB and the creating of the original string list to be searched for, in operation S100, may include creating a root index table in the DB of the consonant string to be searched for and, when m consonant characters are extracted from a consonant string to be searched for, which includes n consonant characters, if a minimum value of $M_{min}$ of a number of consonants m is equal to or higher than 2, creating predetermined index tables, having consonant patterns whose number is equal to or greater than 1 and equal to or less than ($M_{min}-1$) as a key, in the DB of the consonant string to be searched for, with respect to all characters that belong to the first character set in correspondence with the representative language.

The adding of the created consonant string to the DB, in operation S240, may include extracting a combination of all second consonant patterns whose number m of consonants to be extracted is equal to or greater than a minimum number $M_{min}$ and equal to or less than a maximum number $M_{max}$, when m consonant characters are extracted from the consonant string to be searched for, which includes n consonant characters, and adding a pointer, which points at a consonant string that includes the consonant pattern, to all index tables having a string of the respective extracted consonant pattern as an index key.

The minimum number $M_{min}$ is a minimum number of consonants that may be input for a search, and a consonant string whose length is less than the minimum number $M_{min}$ may not be searched for. Additionally, the minimum number $M_{min}$ has an integer value that is equal to or greater than 1, and may be preset.

Additionally, the maximum number $M_{max}$ is a minimum number of consonants that may be input for a search, and a consonant string whose length is greater than the maximum number $M_{max}$ may be ignored. Additionally, the maximum number $M_{max}$ has a value greater than minimum number $M_{min}$, and may be preset.

According to an embodiment of the present invention, an indexed-addition algorithm (method) may be provided as an embodiment in which an algorithm is complicated but a search speed is high, compared to the sequential addition algorithm. The indexed-addition method is performed by extracting a combination of all consonant patterns in which a number m of a length thereof is equal to or greater than a minimum number $M_{min}$ and equal to or less than a maximum number $M_{max}$ and dynamically indexing the combination of all the consonant patterns, when a structure of an index table is defined so that the index table has a particular consonant pattern as an index key, one super-index table is be dynamically linked to a plurality of sub-index tables, and a plurality of consonant string pointers is dynamically added to the index table.

According to an embodiment of the present invention, the initializing of the DB and the creating of the original string list to be searched for, in operation S100, may include creating an empty root index table, which corresponds to a case when a consonant is not present, in the DB, creating predetermined index tables, which have consonant patterns whose number is equal to or greater than 1 and equal to or less than $M_{min}-1$ as a key, in the DB of the consonant string to be searched for, with respect to all characters that belong to a consonant string set which corresponds to a representative language, if $M_{max}$ is equal to or greater than 2, and linking the created index tables to each other.

Additionally, the adding of the created consonant string to the DB, in operation S240, may include extracting a combination of all second consonant patterns whose number m of consonants to be extracted is equal to or greater than a minimum number $M_{min}$ and equal to or less than a maximum number $M_{max}$, when m consonant characters are extracted from n consonant strings (for example, a consonant string to be searched for, which includes n consonant characters), and adding a pointer which points at a consonant string that includes the consonant patterns to all index tables having a string of the respective extracted consonant pattern as an index key.

Additionally, the adding of the pointer may further include, if an index table that corresponds to the extracted second consonant pattern is not created, dynamically creating the index table based on the extracted second consonant pattern, and linking the dynamically-created index table that is a sub-index table, described above, to the super-index table. The super-index table may be an index table that has an index key in a pattern that is obtained by excluding from the sub-index table a consonant character at a last part of an index key in the sub-index table.

In other words, according to an embodiment of the present invention, the adding of the pointer may further include if an index table having the extracted second consonant pattern as an index key is not already created, dynamically creating a corresponding index table, and linking the corresponding table to the super-index table having an index key in a pattern that is obtained by excluding a last character from a key in the corresponding table that is a sub-index table. Since each data elements used for indexing and data addition (for example, each consonant string to be searched for, extracted consonant patterns, an index key in each table, or the like) are not dependent on but completely independent from a particular language or character, the indexed-addition method, described above, may be commonly and comprehensively applied to arbitrary phonogram-based languages.

According to an embodiment of the present invention, with respect to the extracting of the combination of all the second consonant patterns, when m consonant characters are extracted from the consonant string to be searched for, which includes n consonant characters, a maximum value of all consonant patterns that will be extracted without redundancy may be determined as shown below.

$$(\text{Maximum value of a number of cases of a combination of consonant patterns}) = \sum_{m=M_{min}}^{M_{max}} {}_nC_m = \sum_{m=M_{min}}^{M_{max}} \frac{n!}{m!(n-m)!}$$

$M_{max}$ is identical to a maximum length of a consonant string to be searched when a consonant is searched for afterward, that is, a maximum number of consonants that may be searched for. In order not to limit a length of a consonant string to be searched for, $M_{max}$ may be only set to have a sufficiently high value (for example, a maximum value of an integer). According to an embodiment of the present invention, if $M_{min}$ is set to 2 and $M_{max}$ is set to 8, a maximum value of a number of cases of consonant patterns according to a length of a consonant string to be searched for is shown below.

| A length of a consonant string to be searched for | Development of Equation | Maximum value of a number of cases |
|---|---|---|
| 2 | $_2C_2$ | 1 |
| 3 | $_3C_2 + {}_3C_3$ | 4 |
| 4 | $_4C_2 + {}_4C_3 + {}_4C_4$ | 11 |
| 5 | $_5C_2 + {}_5C_3 + {}_5C_4 + {}_5C_5$ | 26 |
| 6 | $_6C_2 + {}_6C_3 + {}_6C_4 + {}_6C_5 + {}_6C_6$ | 57 |
| 7 | $_7C_2 + {}_7C_3 + {}_7C_4 + {}_7C_5 + {}_7C_6 + {}_7C_7$ | 120 |
| 8 | $_8C_2 + {}_8C_3 + {}_8C_4 + {}_8C_5 + {}_8C_6 + {}_8C_7 + {}_8C_8$ | 247 |
| 9 | $_9C_2 + {}_9C_3 + {}_9C_4 + {}_9C_5 + {}_9C_6 + {}_9C_7 + {}_9C_8$ | 501 |
| 10 | $_{10}C_2 + {}_{10}C_3 + {}_{10}C_4 + {}_{10}C_5 + {}_{10}C_6 + {}_{10}C_7 + {}_{10}C_8$ | 1002 |

Additionally, the receiving of the first consonant pattern that includes a plurality of consonants input via the character input unit, in operation S300, may further include limiting an input of all vowel keys via the character input unit. By doing so, inputting of vowel characters via the character input unit may be prevented.

FIG. 4 illustrates a method of adding and searching for data by using linkage of a plurality of created index tables according to an embodiment of the present invention.

As described above, according to an embodiment of the present invention, compared to other algorithms, the indexed-addition algorithm is not simple, but has a fastest search speed in theory, requires a certain period of time for DB creation, and takes much storage space. Additionally, since the indexed-addition algorithm is not dependent on but completely independent from a particular language or character, the indexed-addition algorithm, described above, may be commonly and comprehensively applied to arbitrary phonogram-based languages.

As an embodiment of the indexed-addition algorithm, a case when a minimum value $M_{min}$ of a length of a consonant pattern is 2, and a maximum value $M_{max}$ of a length of a consonant pattern is described as an example. If $M_{min}$ is 1, it may be almost impossible to find a search result without scrolling, and even if 8 characters or more of a consonant pattern is input, it is almost impossible to find a search result without scrolling, a length of a consonant pattern, having 2 to 8 characters, may be in an appropriate range for searching for most data. Additionally, in a case of a Korean name, considering that a maximum number of initial and final consonants is 8, an appropriate length of a consonant pattern may be in a range from 2 to 8.

An embodiment of a structure of an index table in which a particular consonant pattern is included as an index key, one super-index table and a plurality of sub-index tables may be dynamically linked to each other, and a plurality of consonant string pointers may be dynamically added to the index table is shown in Table 14 provided below.

TABLE 14

Index Table

| Field | Attribute | number |
|---|---|---|
| Index key | String | 1 |
| Super-index table | Pointer | 1 |
| Array of Sub-index table | Pointer | Several |
| Array of name information table | Pointer | Several |

According to an embodiment of the present invention, a structure of an index table that has a point pointing at a consonant string as a field is described. However, a pointer may point at an arbitrary table that includes a consonant string field. Table 15 shows an example in which a pointer points at a name information table.

TABLE 15

Name information table

| Field | Attribute | number |
|---|---|---|
| All consonant strings | String | 1 |
| Name | String | 1 |
| Phone number array | String | Several |
| Index table array | Pointer | Several |

As an example, in a case of a phone book, a simple name information table may be defined as shown in FIG. 4. As a reference, since a plurality of index records may be linked to one name information record, a size of a required storage space of a DB may be optimized by designing the DB so that with respect to a particular name, only one record may be created as a name information table.

In order to intuitively show a structure of linkage between index tables, respective pointers are shown as an arrow, an index table is shown as a box of an index key, and a name information table is shown as a box of items other than a pointer.

For convenience of description, "Smith" is used as a name so that not too many index tables are not present in the description. FIG. 4 shows an embodiment in which a name information table having "Smith" as a name is prepared, a DB for an {English-Latin} language-script group is initialized, and adding a table of "Smith" to the DB for a first time according to the indexed-addition algorithm.

According to an embodiment of the present invention, the preparing of a name information table means that a name information table in which a whole consonant string is "smith" is prepared. The initializing of the DB for the {English-Latin} language-script group corresponds to creating a root index table in the DB of a consonant string to be searched for and, when m consonant characters are extracted from the consonant string to be searched for, which includes n consonant characters, if a minimum value of $M_{min}$ of a number of consonants m to be extracted is equal to or higher than 2, creating predetermined index tables having consonant patterns, whose number is at least equal to or greater than 1 and equal to or less than ($M_{min}-1$), respectively as a key in the DB of the consonant string to be searched for, and mutually linking predetermined index tables to each other. In other words, with respect to the initializing of the DB for the {English-Latin} language-script group, after an empty root index table is created, empty predetermined index tables may be created for each character of a consonant string set in a combination of {English-Latin} shown in Table 5, and each predetermined index table and the root index table may be mutually linked to each other. Additionally, with respect to the initializing of the DB for the {English-Latin} language-script group, all tables are not linked to a name information table yet. "Mutual link" may mean that table pointers, which are fields of two tables to be linked to each other, respectively point at the counterpart of itself. "Mutual link" may be referred to as a "bidirectional relationship". For example, in FIG. 4, if [Root] and [s] are mutually linked to each other, this means that a pointer which points at [s] is added to an array of a sub-index table of [Root], and a super-indexed table of [s] is set to point at [Root].

Additionally, the adding of the table of "Smith" to the DB for a first time according to the indexed-addition algorithm is a process of indexing and linking a name information table of "Smith" to the initialized DB for a first time. The adding of the table of "Smith" to the DB may correspond to the extracting of a combination of all second consonant patterns whose number m of consonants to be extracted is equal to or greater than a minimum number $M_{min}$ and equal to or less than a maximum number $M_{max}$, when m consonant characters are extracted from the consonant string having a length of n (for example, a consonant string to be searched for, which includes n consonant characters), adding a pointer pointing at a consonant string that includes the consonant patterns to all index tables having a string of the respective extracted consonant pattern as an index key, dynamically creating the index table based on the extracted second consonant pattern, and linking the dynamically-created index table that is a sub-index table to the super-index table if an index table that corresponds to the extracted second consonant pattern is not created.

For example, if all consonant patterns whose length is equal to or greater than 2 and equal to or less than 8 are extracted from a consonant string "Smith" having a length of 4, 11 combination may be obtained as shown in FIG. 16 provided below.

TABLE 16

| Length of a consonant pattern | A number of cases of a consonant pattern | Types of consonant patterns for each length |
|---|---|---|
| 2 | 6 | sm, st, sh, mt, mh, th |
| 3 | 3 | smt, smh, sth, mth |
| 4 | 1 | Smth |

In the example described above, since an index table is not created, the dynamically creating of the not-created index table and the linking of the dynamically-created index table that is a sub-index table to the super-index table need to be performed first. Accordingly, as shown in FIG. 4, a total of 11 index tables are dynamically created and added to the DB, and the respective index tables are mutually linked to a corresponding super-index table. A super-index table of a particular index table may be defined as an index table having a key of a pattern in which a last character of an index key in a corresponding index table is excluded. Accordingly, for example, a sub-index table and a super-index table may be mutually linked to each other by setting a pointer of a super-index table of [smt] to point at [smt] that has an index key that is obtained by excluding a last character "h", and adding a pointer that points at [smth] to an array of the sub-index table of [smt].

In the example described above, since all of 11 index tables necessary for indexing the consonant string "smth"

are present, each index table and a name information table, which correspond to Table 16, are mutually linked to each other. For example, each index table and the name information table are mutually linked to each other by adding a pointer pointing at a table of "Smith" to a name information table array of [smth], and adding a pointer pointing at [smth] to an index table array of the table of "Smith".

According to an embodiment of the present invention, a hybrid-addition algorithm may be employed. A hybrid-addition algorithm is obtained by mixing a sequential-addition algorithm and a indexed-addition algorithm. Since two algorithms are mixed into the hybrid-addition algorithm, the hybrid-addition algorithm is most complicated compared to the other algorithms. However, the hybrid-addition algorithm provides a considerably fast search speed to satisfy a user, provides a relatively short DB creation time compared to the indexed-addition algorithm, and takes up a much smaller storage space than the indexed-addition algorithm. Additionally, since the hybrid-addition algorithm is not dependent on but completely independent from a particular language or character, the hybrid-addition algorithm may be commonly and comprehensively applied to arbitrary phonogram-based languages.

The hybrid-addition algorithm may be implemented by using various methods. According to an embodiment of the present invention, the hybrid-addition algorithm may be performed by using following steps.

(a) Predetermining a certain number $N_T$ that is defined as a maximum number of name information tables, so that a sub-index table is not created in each index table, (b) not creating a sub-index table, if a number of name information tables connected to a particular index table does not exceed $N_T$, and (c) recursively creating sub-index tables that corresponds to all name information tables connected to a corresponding index table, if a number of name information tables connected to a particular index table exceeds $N_T$, wherein whether or not sub-index tables, which is performed by each of the created sub-index tables, are created complies with a condition of step (b).

By using the hybrid-addition algorithm, in a case of an index table whose number of tables of name information does not exceed $N_T$, a sub-table of the index table may not have to be created. Thus, a DB creation time may be reduced, and a DB storage space may be reduced. This is because a difference in a DB storage space size increase rate (in proportion to a DB addition time increase rate) between the indexed-addition algorithm and a hybrid-addition algorithm is considerably great, as shown in Table 17. A value of $N_T$ may be a threshold for determining sequential addition and indexed addition with respect to the hybrid-addition algorithm for DB creation. If a number of pieces of data, added to a particular index table, is equal to or less than the value of $N_T$, sequential addition may be performed. If a number of pieces of data, added to a particular index table, is greater than the value of $N_T$, indexed period of time during which a user feel inconvenient due to a low speed of performing a full search for $N_T$ name information tables. Empirically if a value of $N_T$ is set so that a full search may be performed within about 0.1 to 0.5 second, even if a hybrid-addition algorithm for partially performing a full search, a user may feel that a search speed is almost identical to a search speed when a complete indexed-addition algorithm is used.

According to an embodiment of the present invention, a comparison of performances of the DB addition algorithms is as shown below.

| DB addition algorithm | DB search algorithm | Storage space of indexing | Search speed |
|---|---|---|---|
| Sequential addition | Full search | None | Lowest |
| Indexed addition | Indexed search | Considerable great | Fastest |
| Hybrid addition | Hybrid search | Considerably small | Considerably fast |

FIG. 5 is a flowchart of a consonant pattern comparison algorithm according to an embodiment of the present invention.

According to an embodiment of the present invention, the searching for of the second consonant pattern that matches the first consonant pattern in the DB of the consonant string to be searched for, which is created as a representative language related to the character input unit, may include sequentially reading of all constant strings included in the DB of the consonant string to be searched for, which is created as a representative language related to the character input unit, and searching for the second consonant pattern by comparing the first consonant pattern to the read consonant string.

The creating of the search result list that includes at least one consonant string having the searched for second consonant pattern may include creating a search result list by extracting and listing at least one consonant string that includes a second consonant pattern, with respect to all consonant strings included in the DB of the consonant string to be searched for.

According to an embodiment of the present invention, if a DB is created by using a sequential-addition method, a full search may be performed to obtain a search result list by searching for a consonant pattern in an arbitrary location in the DB.

For example, all consonant strings stored in a DB that corresponds to a representative language, in correspondence with a keyboard that is currently being used (or an activated keyboard) may be sequentially read one by one, a consonant pattern to be searched for may be compared to the consonant string that is read from the DB and the consonant pattern is

TABLE 17

| Optimization Viewpoint | DB addition algorithm | Storage space of indexing | Storage space size increase rate | Search speed | Search time increase rate |
|---|---|---|---|---|---|
| Minimum storage space | Sequential addition | None | O(0) | Lowest | $O(n_{DB})$ |
| Highest search speed | Indexed addition | Considerable great | $O(n_{DB} \cdot n^{\bar{1}})$ | Fastest | $O(m)$ |
| Expected search speed | Hybrid addition | Considerably small | $O(n_{DB}/N_T \cdot n^{\bar{1}})$ | Considerably fast | $O(m) + O(N_T)$ |

An important set value with respect to an optimization viewpoint is $N_T$. A value of $N_T$ may only be shorter than a found, a searched for consonant string may be added to the search result list if the consonant pattern is found, and the sequential reading of all the consonant strings, and the comparing of the consonant pattern, the adding of the searched for consonant string may be repeated until a last consonant string to be searched for in the DB is reached.

According to an embodiment of the present invention, an example of a consonant pattern comparison algorithm is shown in FIG. 5.

Temporary character variables C1 and C2 and integer loop variables i and j are initialized. The initializing may include a process of setting C1, C2, i, and j to zero.

In operation S10, whether the integer loop variable i is smaller than a consonant pattern length (len_p) to be searched for, and whether the integer loop variable j is smaller than a consonant string length (len_s) to be searched for are determined. If the integer loop variable i is smaller than the consonant pattern length (len_p) to be searched for, and whether the integer loop variable j is smaller than a consonant string length (len_s) to be searched for, operation S20 is performed. If a case is the opposite, operation S60 is performed.

In operation S20, the temporary character variable C1 is substituted with an ith character of the consonant pattern string to be searched for, and the integer loop variable i is increased by one. A 0th character may be a first character of the consonant pattern string.

In operation S30, the temporary character variable C2 is substituted with a jth character of the consonant pattern string to be searched for, and the integer loop variable j is increased by one. A 0th character may be a first character of the consonant pattern string.

In operation S40, whether C2 is not identical to C1, and whether j is smaller than len_s are determined. If C2 is not identical to C1 and j is smaller than len_s, operation S30 is repeated. In an opposite case, operation S50 is performed.

In operation S50, whether C2 is different from C1 is determined. If C2 is not different from C1, operation S10 is repeated. In an opposite case, operation S60 is performed.

In operation S60, whether C2 is identical to C1 and whether i is equal to or greater than len_p are determined. If C2 is identical to C1 and j is equal to or greater than len_p, it is determined that a same pattern is searched for. In an opposite case, a it is determined that a same pattern is not searched for.

FIG. 6 is a flowchart of an algorithm for an indexed search for data by using a plurality of index tables, according to an embodiment of the present invention.

The searching for of a second consonant pattern that matches the first consonant pattern in the DB of the consonant string to be searched for, which is created as a representative language related to the character input unit may include referencing a root index table as a current index table and setting a loop variable k to 0, comparing an index key of the current index table to the first consonant pattern, if an index key of the current index table does not match the first consonant pattern, searching for a sub-index table that matches the first consonant pattern by comparing a kth character of the first consonant pattern to a kth character that is a character placed at a last position of an index key of at least sub-index table connected to the current index table, referencing the searched for sub-index table as the current index table and increasing the loop variable k by 1, and then, recomparing the index key of the current index table to the first consonant pattern, and if an index key of the current index table matches the first consonant pattern, designating the current index table as a search result index table.

Additionally, when the comparing or the recomparing is performed, the creating of the search result list may include creating as a search result list at least one consonant string that the search result index table points at, if the index key of the current index table matches the first consonant pattern and creating a search result list that shows the search result is not present, if the index key of the current index table that matches the first consonant pattern is not found.

According to an embodiment of the present invention, if a DB is created by using the indexed-addition method, an indexed search may be performed as follows, so as to search for a consonant pattern in an arbitrary location in the DB and obtain the search result list.

In operation S1 which is an initializing step, a root index table is referenced as a current index table and a loop variable k may be set to 0, in a DB that corresponds to a representative language in correspondence with a keyboard that is currently being used. Similarly to the description with respect to i or j provided above, a 0th character refers to a first character.

In operation S2 that is an index tracking step, an index key of the current index table may be compared to a consonant pattern to be searched for. If the index key of the current index table is identical to the consonant pattern to be searched for, a search result index table is designated as the current index table, and operation S3 is performed. In an opposite case, operation S4 is performed.

In operation S3, if the search result index table is found, at least one consonant string, indicated by a corresponding table (for example, the current index table), may be created as a search result list.

In operation S4, a kth character that is a last character of the index key string in the sub-index tables connected to the current index table may be compared to a kth character of the consonant pattern. In other words, a kth character of the index key string in the sub-index tables is compared to a kth character of the consonant pattern to be searched for. If the kth character of the index key string in the sub-index tables is identical to the kth character of the consonant pattern to be searched for, operation S5 is performed. If the kth character of the index key string in the sub-index tables is not identical to the kth character of the consonant pattern to be searched for, operation S6 is performed.

In operation S5, if a sub-index table in which the kth character of the index key string in the sub-index tables is identical to the kth character of the consonant pattern is found, the corresponding sub-index table is referenced as the current index table, k is increased by one, and then, the index tracking loop is repeated from operation S2. In an opposite case, operation S6 is performed.

In operation S6, it may be showed that a search result is not present.

As necessary, if a more capacity of a DB can be used, instead of repeatedly comparing index keys of the sub-index tables in operation S4, an array having an order value of a kth character as a subscript may reference the sub-index tables. Thus, the sub-index table, which is to be searched for by using an array, may be directly referenced at one time. Accordingly, operation S4 may not have to be repeated.

With respect to the indexed-search method described above, linkage between indexed tables may be traced and reference in correspondence with a number of characters in a consonant pattern to be searched for, and all consonant strings having a same consonant pattern as a corresponding index key are already searched for in a search result index table that is finally found. Thus, the search result index table may be a search result list. Accordingly, by using the indexed-search method, a DB may be referenced for a smallest number of times in theory, compared to other search methods. Thus, a search result list may be obtained in a moment in a shortest period of time.

FIG. 7 is a flowchart of a method of creating a character input unit for inputting consonant characters according to an embodiment of the present invention.

According to an embodiment of the present invention, the method of creating the character input unit for inputting a consonant character includes selecting a first character input unit having a predetermined keyboard array in operation S1000, identifying consonant keys, vowel keys, and additional function keys from among a plurality of character keys arrayed on the first character input unit in operation S3000, activating at least one of the consonant keys and the additional function keys from among the identified plurality of keys and deactivating the other keys in operation S5000, and creating a second character input unit by using the activated keys in operation S7000.

According to an embodiment of the present invention, the character input unit may include a phonetic keyboard or a virtual keyboard.

If a national-standard or conventional phonetic keyboard, which corresponds to an arbitrary language that may be written by using a phonetic character, may be used, an optimized character input unit, which may minimize typographical errors and allow a fast input, and to which a user may easily get accustomed, may be created according to an embodiment of the present invention. For convenience of description, the character input unit may be also referred to as a consonant-dedicated keyboard.

According to an embodiment of the present invention, in operation S1000, a national-standard or conventional phonetic keyboard, which corresponds to a combination of an arbitrary language-script that may be written by using a phonetic character, may be selected.

In operation S3000, consonant keys that correspond to initial and final consonants, vowel keys that corresponds to vowels, and editing keys (for example, additional function keys, or the like) from among keys arrayed on the keyboard may be separated. Separation of the keys may include identification of the keys.

In operation S5000, keys other than the consonant keys or minimum editing keys may be deactivated.

In operation, a character input unit may be created by using activated consonant keys or the minimum editing keys.

According to an embodiment of the present invention, the deactivating of the keys in operation S5000 may include removing remaining other keys than the consonant keys or the additional function keys, from among the identified plurality of keys, or limits an input of the other keys.

FIG. 8 is a flowchart of a method of creating a character input unit that includes a key that is changed according to an embodiment of the present invention.

According to an embodiment of the present invention, the method of creating the character input unit for inputting a consonant character may further include changing at least one of a location and a size of an activated consonant key or an activated additional function key in operation 6000. A second character input unit may be created to include a key of which at least one of a location and a size is changed.

According to an embodiment of the present invention, in order to help a user to easily get accustomed to a new keyboard, a change in a keyboard layout needs to be minimized. Thus, a size of each key may be expanded at maximum, by using a spare space caused by removed keys so that a fast input may be made while a relative location of the remaining consonant keys is maintained at maximum.

Additionally, if necessary, some keys that may be difficult to array due to lack of a space may be move a location in which a spare space is present.

According to an embodiment of the present invention, the changing of at least one of a location and a size of an activated consonant key or an activated additional function key, in operation 6000, may include grouping phonologically-related characters with respect to the consonant, determining a representative character for each group obtained by the grouping, removing characters that belong to the group other than the determined representative character, and changing at least one of a location and a size of a key that represents the determined representative character. In other words, as necessary, an efficient space layout may be made on the character input unit by grouping keys that are difficult to be grouped due to a lack of a space according to phonologically-related characters, selecting a representative character for each group, and disposing only a corresponding representative character other than all other characters that belong to each group.

According to an embodiment of the present invention, the determining of the representative character for each group obtained by the grouping may include creating a key mapping table for mapping a consonant key as a representative character and determining a representative character for each group obtained by the grouping according to the created key mapping table. Additionally, if necessary, a key mapping table for mapping and converting all arrayed keys into characters of a representative language may be created and applied so as to integrate characters into the representative language.

According to an embodiment of the present invention, the activating of at least one of the consonant keys and the additional function keys from among the identified plurality of keys and the deactivating of the keys, in operation S5000, may include selectively activating only characters that are used as initial consonants or only consonants and vowels that are used as initial letters, from among the identified plurality of keys, according to characteristics of a representative language which the first character input unit belongs to, and selectively deactivating or removing a consonant that is used as a final consonant. If an initial consonant search for searching for only an initial consonant of each syllable or an initial letter search for searching for only an initial letter of each syllable or word is efficient for creating a character input unit and searching for characters due to characteristics of a particular language, vowels that are used for an initial consonant or an initial letter may be included. Additionally, if unnecessary due to characteristics of a particular language, a consonant that is used for only a final consonant may be excluded.

As described above, the first character input unit and the second character input unit may include a phonetic keyboard or a virtual keyboard.

Figure 9A:
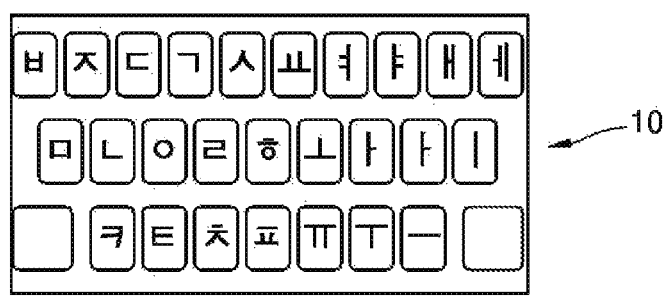
FIGS. 9A and 9B respectively illustrate a typical standard two-set Korean keyboard and a two-set Korean keyboard for inputting consonant characters according to an embodiment of the present invention.
Figure 9B:
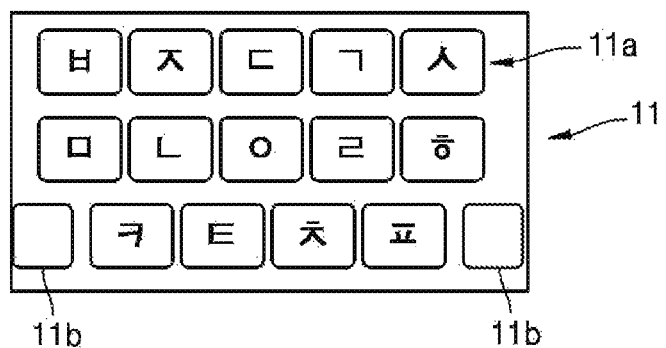

FIGS. 9A and 9B respectively illustrate a typical standard two-set Korean keyboard 10, and a two-set Korean keyboard for inputting consonant characters according to an embodiment of the present invention.

FIG. 9A shows an example of the standard two-set Korean keyboard 10.

According to an embodiment of the present invention, as shown in FIG. 9B, a character input unit 11 having a 3-row 14-key layout may be created. The character input unit 11 may be referred to as a consonant-dedicated virtual keyboard. In the keyboard shown in FIG. 9B, "ㅇ" that is a silent character is regarded as a consonant and included in a consonant search, but may be excluded in a consonant search as necessary. Grey keys 11*b* at both sides at a lower part, shown in FIG. 9B and other drawings described thereafter, represent exemplary editing keys.

Figure 10A:
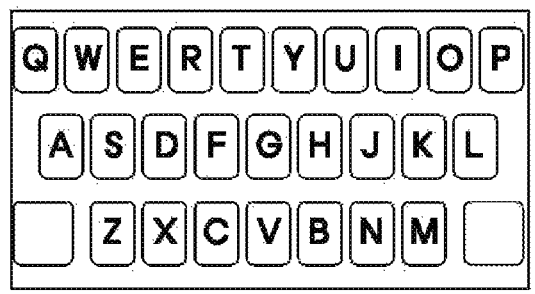
FIGS. 10A and 10B respectively illustrate a typical standard English QWERTY keyboard and a QWERTY keyboard for inputting consonant characters according to an embodiment of the present invention.
Figure 10B:
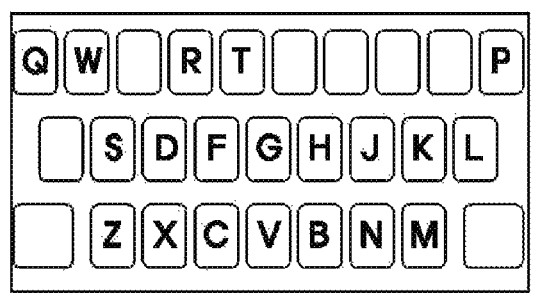

FIGS. 10A and 10B respectively illustrate a typical standard English QWERTY keyboard, and a QWERTY keyboard for inputting consonant characters according to an embodiment of the present invention;

FIG. 10A shows an example of the typical standard English QWERTY keyboard. According to an embodiment of the present invention, for example, as shown in FIG. 10B, a consonant-dedicated virtual keyboard having a 3-row 20-key layout may be created. White keys in a location of vowels, shown in FIG. 10B, may be selectively laid out, and thus, may be removed.

Figure 11A:
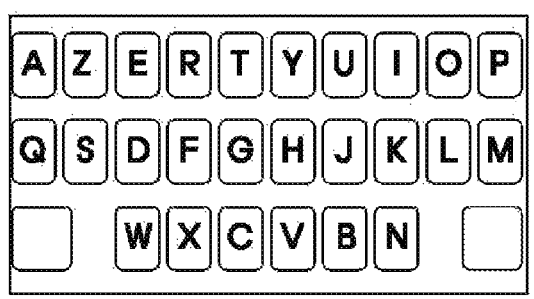
FIGS. 11A and 11B respectively illustrate a typical standard English AZERTY keyboard and an AZERTY keyboard for inputting consonant characters according to an embodiment of the present invention.
Figure 11B:
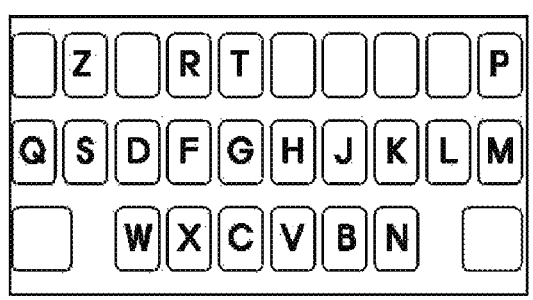

FIGS. 11A and 11B respectively illustrate a typical standard English AZERTY keyboard and an AZERTY keyboard for inputting consonant characters according to an embodiment of the present invention.

FIG. 11A shows an example of the standard English QWERTY keyboard. According to an embodiment of the present invention, for example, as shown in FIG. 11B, a consonant-dedicated virtual keyboard having a 3-row 20-key layout may be created. White keys in a location of vowels, shown in FIG. 11B, may be selectively laid out, and thus, may be removed.

Figure 12A:
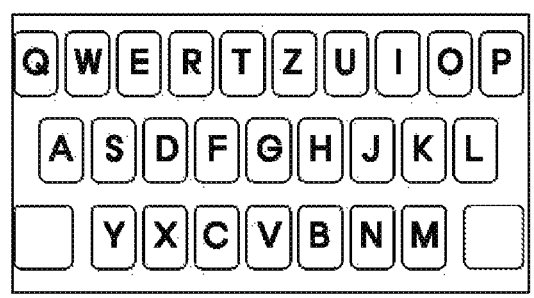
FIGS. 12A and 12B respectively illustrate a typical standard English QWERTZ keyboard and a QWERTZ keyboard for inputting consonant characters according to an embodiment of the present invention.
Figure 12B:
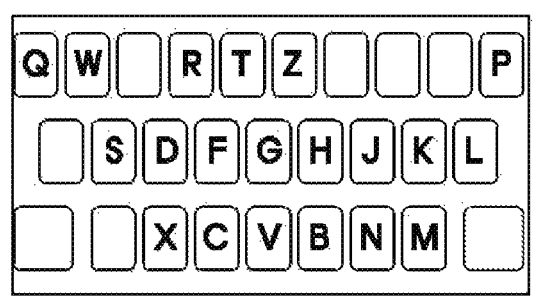

FIGS. 12A and 12B respectively illustrate a typical standard English QWERTZ keyboard, and a QWERTZ keyboard for inputting consonant characters according to an embodiment of the present invention.

FIG. 12A shows an example of the standard English QWERTY keyboard.

According to an embodiment of the present invention, for example, as shown in FIG. 12B, a consonant-dedicated virtual keyboard having a 3-row 20-key layout may be created. White keys in a location of vowels, shown in FIG. 12B, may be selectively laid out, and thus, may be removed.

Figure 13A:
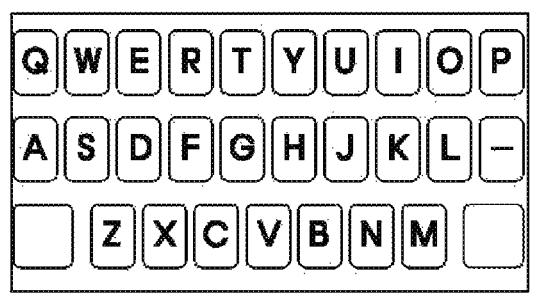
FIGS. 13A and 13B respectively illustrates a conventional Japanese Romaji keyboard and a Romaji keyboard for inputting consonant characters according to an embodiment of the present invention.
Figure 13B:
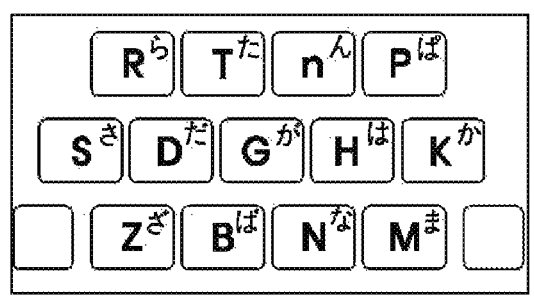

FIGS. 13A and 13B respectively illustrates a typical Japanese Romaji keyboard and a Romaji keyboard for inputting consonant characters according to an embodiment of the present invention.

FIG. 12A shows an example of a typical Japanese Romaji keyboard.

According to an embodiment of the present invention, for example, as shown in FIG. 13B, a consonant-dedicated virtual keyboard having a 3-row 20-key layout or a 13-key layout may be created. A [n] key that corresponds to a Japanese final consonant "ん", shown in FIG. 13B, may be selectively laid out, and thus, may be removed if only an initial consonant search is necessary.

With respect to the keyboard shown in FIG. 13B, if each consonant alphabet key is input, the input key is mapped as a Japanese representative character one to one according to Table 18, and each representative character may represent vowels that sound "a" (あ/ア), "i" (い/イ), "u" (う/ウ), "e" (え/エ), or "o" (お/オ) and all characters that have an initial or final consonant identical to a representative character.

TABLE 18

| Input key | B | D | G | H | K | M | N | P | R | S | T | Z | N |
|---|---|---|---|---|---|---|---|---|---|---|---|---|---|
| Mapped Character | ば | だ | が | は | か | ま | な | ぱ | ら | さ | た | ざ | ん |

An arbitrary column (段) may be selected from 50 characters (gojūon) included a Japanese standard character set and used as a representative character. However, Table 18 shows an embodiment in which a column あ of harakana is selected. In this case, for example, the character は may represent ten characters such as hirakana characters は, ひ, ふ, へ, and ほ and katakana characters ハ, ヒ, フ, へ, and ホ. A character ん may represent two characters such as ん and ン.

Figures 14A, 14B:
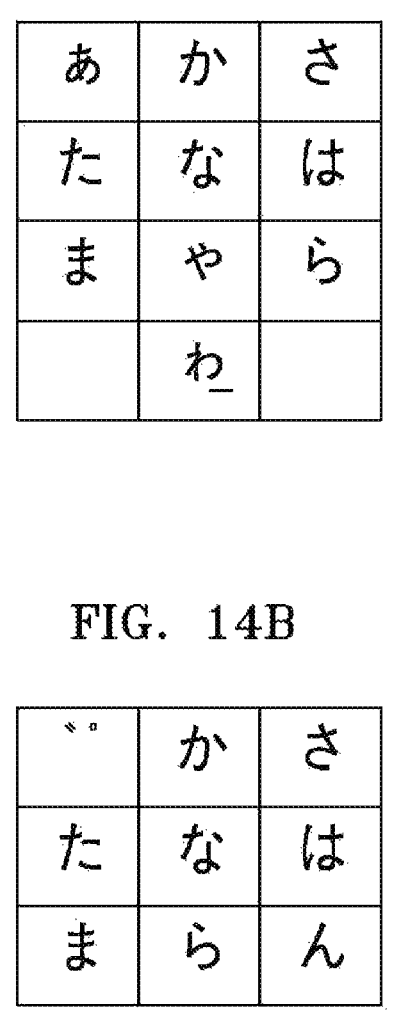

FIGS. 14A and 14B respectively illustrate a typical Japanese 10-key keyboard and a 9-key keyboard for inputting consonant characters according to an embodiment of the present invention.

FIG. 14A shows an example of a Japanese 10-key keyboard that is widely used for a feature phone and a smartphone. According to an embodiment of the present invention, a consonant-dedicated virtual keyboard having a 3×3 layout, which is formed of 9 keys such as include 8 representative character keys without a voicing mark (dakuten) and a voicing mark (dakuten) key may be created.

An arbitrary column may be selected from 50 characters (gojūon) included in a Japanese standard character set and used as a representative character. Table 14B shows an embodiment in which a column あ of harakana is selected. If necessary, in FIG. 14B, a location of the voicing mark key and a location of the [ん] key may be exchanged with each other. If only an initial consonant search is necessary, the [ん] key may be removed.

Unlike the typical 10 keys, if the representative keys, shown in FIG. 14B, are consecutively input, the representative keys may not be toggled to another character in the same column from among the 50 characters.

Additionally, with respect to the keyboard shown in FIG. 14B, if the voicing mark key is consecutively input, a representative character that was input right before the voicing mark key may be toggled between a character having a voicing mark key and a character without a voicing mark key, and converted according to Table 19.

TABLE 19

| Representative Character | Toggle repetition order |
|---|---|
| か | か→が→か→... |
| さ | さ→ざ→さ→... |
| た | た→だ→た→... |
| は | は→ば→ぱ→は→... |

Figure 15A:
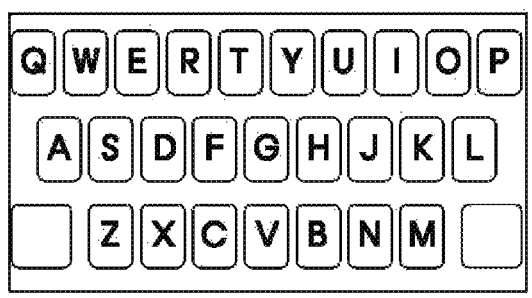
FIGS. 15A and 15B respectively illustrate a typical standard Chinese Pinyin keyboard and a Pinyin keyboard for inputting initial letters according to an embodiment of the present invention.
Figure 15B:
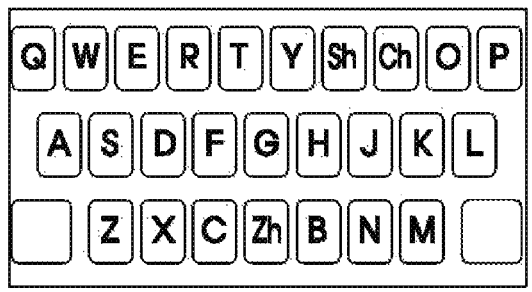

FIGS. 15A and 15B respectively illustrate a typical standard Chinese Pinyin keyboard and a Pinyin keyboard for inputting initial letters according to an embodiment of the present invention.

FIG. 15A shows an example of a standard Chinese Pinyin keyboard. According to an embodiment of the present invention, as shown in FIG. 15B, an initial letter-dedicated virtual keyboard having a 3-row and 26-key layout may be created. Considering that a Chinese character is formed of a combination of an initial consonant and a final consonant, instead of a combination of a consonant and a vowel and that if a Chinese character is converted, it is essential to search for a Chinese character that is formed of only a final consonant without an initial character, and in order to search for a search word by using a minimum key input, the keyboard shown in FIG. 15B may perform an initial letter search for searching for a Pinyin initial letter of each syllable, that is, searching for only a first Pinyin character. In other words, one Pinyin syllable corresponds to one initial letter, and in the corresponding syllable, a character other than an initial letter may be ignored.

Additionally, a Pinyin character that may be an initial letter includes a total of 26 characters such as 21 consonants and 5 vowels. Since keys that correspond to three consonants "Zh", "Ch", and "Sh" are not provided in the standard English QWERTY keyboard, the three consonants "Zh", "Ch", and "Sh" may substitute "V", "I", "U", which cannot be an initial letter of each syllable according to a Pinyin standard, and thus, keys that correspond to the three consonants "Zh", "Ch", and "Sh" may be placed as shown in FIG. 15B. The consonants "Zh", "Ch", and "Sh" may be arbitrarily mapped in locations of keys of the characters "V", "I", and "U". According to an embodiment of the present invention, FIG. 15 shows a case when mappings with respect to corresponding keys are provided in a conventional double Pinyin keyboard.

In order to effectively integrate a multilingual consonant search, if a key having one character, such as a key [B], [P], or the like, mapping is not performed, and if a key having two characters, such as a key [Zh], [Ch], or [Sh], mapping is performed as shown in Table 20. Thus, all of 26 Pinyin initial letters, arranged in Table 10, may respectively correspond to an English alphabet character one to one. Each of the keys [Zh], [Ch], and [Sh] may arbitrarily mapped with the characters "V", "I", and "U". According to an embodiment of the present invention, Table 20 shows a case when mappings with respect to corresponding keys are provided in a conventional double Pinyin keyboard.

TABLE 20

| Input key | Zh | Ch | Sh |
|---|---|---|---|
| Mapped character | V | I | U |

Figure 16A:
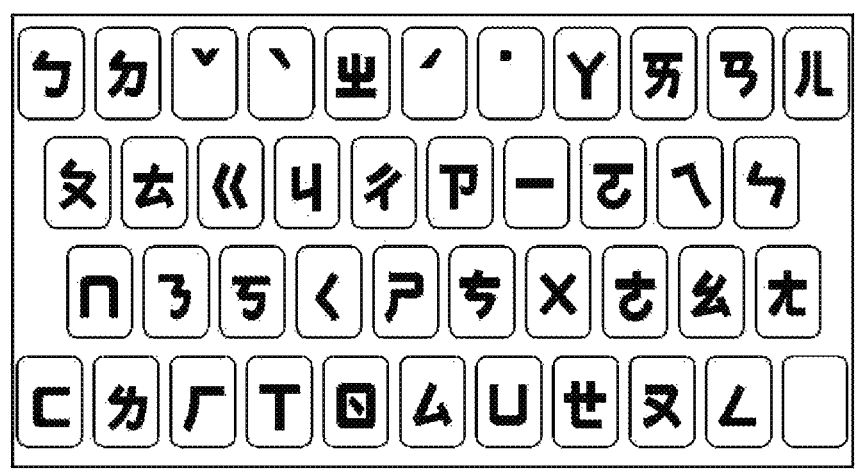
FIGS. 16A and 16B respectively illustrate a typical standard Chinese Zhuyin keyboard and a Zhuyin keyboard for inputting initial letters according to an embodiment of the present invention.
Figure 16B:
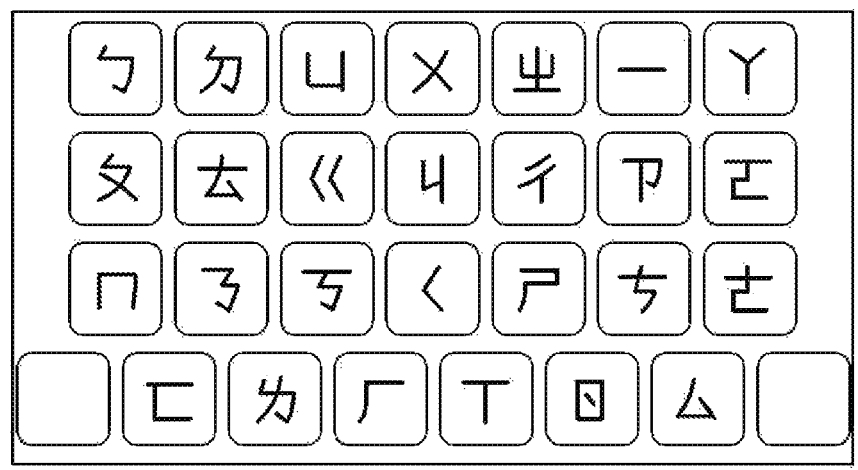

FIGS. 16A and 16B respectively illustrate a typical Chinese Zhuyin keyboard, and a Zhuyin keyboard for inputting initial letters according to an embodiment of the present invention.

FIG. 16A shows an example of a conventional Chinese Zhuyin keyboard.

According to an embodiment of the present invention, as shown in FIG. 16B, an initial letter-dedicated virtual keyboard having a 4-row and 27-key layout may be created. Considering that a Chinese character is formed of a combination of an initial consonant and a final consonant, instead of a combination of a consonant and a vowel and that if a Chinese character is converted, it is essential to search for a Chinese character that is formed of only a final consonant without an initial character, and in order to search for a search word by using a minimum key input, by using the keyboard shown in FIG. 16B, an initial letter search for searching for a Zhuyin initial letter of each syllable, that is, searching for only a first Zhuyin character may be performed. In other words, one Zhuyin syllable corresponds to one initial letter, and in the corresponding syllable, a character other than an initial letter may be ignored.

With respect to the keyboard shown in FIG. 16B, each key has a largest possible size and initial letters are not displayed, so as to reduce typing errors. Instead, the keyboard may have keys that correspond to a total of 27 characters that include all of 21 consonants and 6 representative vowels, from among Zhuyin character that may be initial letters, as shown in Table. 21.

If a search is made by using only an initial letter instead of an initial consonant, 6 vowel keys may be removed. Additionally, as necessary, locations of vowel keys [ㄚ], [ㄨ], and [ㄩ] may be exchanged with each other.

With respect to the keyboard shown in FIG. 16B, since each key may be mapped into one Pinyin character as shown in Table 21, by converting three character sets such as Hanzi, Pinyin, and Zhuyin, which are used to express Chinese, into Pinyin, the Pinyin keyboard or the Zhuyin keyboard may be used together for performing an integrated search for a Chinese string.

Additionally, 9 vowel characters, which may be initial letters even through not included in the keyboard shown in FIG. 16B, may be searched for by using a representative character whose first letter is identical to a first letter of a corresponding Pinyin character, as shown in Table 22. For example, "ㄤ" (ang) may be searched for by using "ㄚ" (a) whose first Pinyin character is identical to "ㄤ" (ang). Likewise, "ㄦ" (er) may be searched for by using "ㄜ" (e). English letters in a parenthesis shown in Table 22 represent Pinyin characters that correspond to Zhuyin vowels one to one.

TABLE 22

| Zhuyin Character (pinyin) | Representative Character (Pinyin) |
|---|---|
| ㄞ(ai), ㄠ(ao), ㄢ(an), ㄤ(ang) | Y(a) |
| ㄡ(ou) | ㄛ(o) |
| ㄟ(ei), ㄣ(en), ㄥ(eng), ㄦ(er) | ㄜ(e) |
| ㄝ(ê) | Cannot be an initial letter |

Figure 17A:
FIGS. 17A and 17B respectively illustrate a typical standard Russian keyboard and a Russian keyboard for inputting consonant characters according to an embodiment of the present invention.
Figure 17B:

FIGS. 17A and 17B respectively illustrate a typical standard Russian keyboard and a Russian keyboard for inputting consonant characters according to an embodiment of the present invention.

FIG. 17A shows an example of standard Russian keyboard. According to an embodiment of the present invention, as shown in FIG. 17B, a consonant-dedicated virtual keyboard having a 3-row 20-key layout may be created. A white key placed in locations of vowels, shown in FIG. 17B, is selective, and thus, may be removed.

Figure 18A:
FIGS. 18A and 18B respectively illustrate a typical standard Ukraine keyboard and a Ukraine keyboard for inputting consonant characters according to an embodiment of the present invention.
Figure 18B:

FIGS. 18A and 18B respectively illustrate a typical standard Ukraine keyboard, and a Ukraine keyboard for inputting consonant characters according to an embodiment of the present invention.

FIG. 18A shows an example of standard Ukrainian keyboard. According to an embodiment of the present invention, as shown in FIG. 18B, a consonant-dedicated virtual keyboard having a 3-row 20-key layout may be created. A character "Ґ" (Ge Upturn, Unicode U+0490), which is a consonant and included in the standard Ukrainian keyboard but is not shown in FIGS. 18A and 18B, is selective. If shown in FIGS. 18A and 18B, the character "Ґ" (Ge Upturn, Unicode U+0490) may be placed on a left of [Ч] on a third row according to a standard. In FIG. 18B, a white key placed in locations of vowels is selective, and thus, may be removed.

TABLE 21

| Input key | ㄅ | ㄆ | ㄇ | ㄈ | ㄉ | ㄊ | ㄋ | ㄌ | ㄍ | ㄎ | ㄏ | ㄐ | ㄑ | ㄒ |
|---|---|---|---|---|---|---|---|---|---|---|---|---|---|---|
| Mapped Character | B | P | M | F | D | T | N | L | G | K | H | J | Q | X |
| Input key | ㄓ | ㄔ | ㄕ | ㄖ | ㄗ | ㄘ | ㄙ | ㄚ | ㄛ | ㄜ | ㄧ | ㄨ | ㄩ | |
| Mapped Character | V | I | U | R | Z | C | S | A | O | E | Y | W | Y | |

Figure 19A:
FIGS. 19A and 19B respectively illustrate a typical standard Bulgarian keyboard and a Bulgarian keyboard for inputting consonant characters according to an embodiment of the present invention.
Figure 19B:

FIGS. 19A and 19B respectively illustrate a typical standard Bulgarian keyboard, and a Bulgarian keyboard for inputting consonant characters according to an embodiment of the present invention.

FIG. 19A shows an example of standard Bulgarian keyboard. According to an embodiment of the present invention, as shown in FIG. 19B, a consonant-dedicated virtual keyboard having a 3-row 20-key layout may be created. A white key placed in locations of vowels, shown in FIG. 19B, is selective, and thus, may be removed.

Figure 20A:
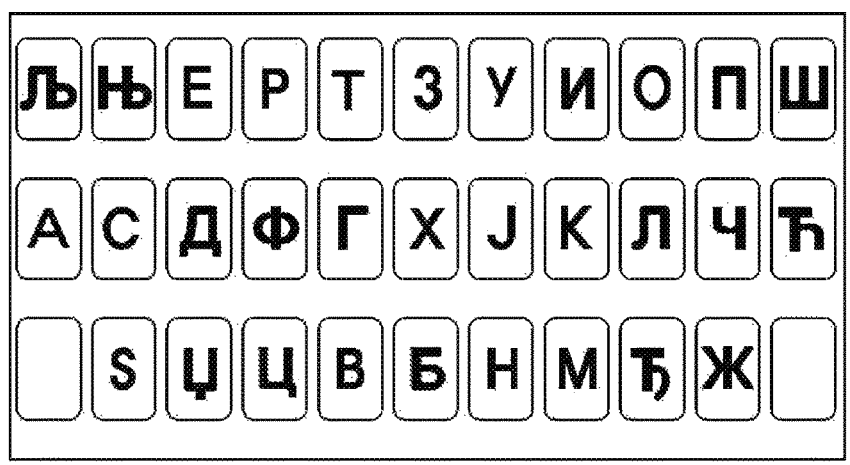
FIGS. 20A and 20B respectively illustrate a typical Serbian Cyrillic keyboard and a Serbian Cyrillic keyboard for inputting consonant characters according to an embodiment of the present invention.
Figure 20B:
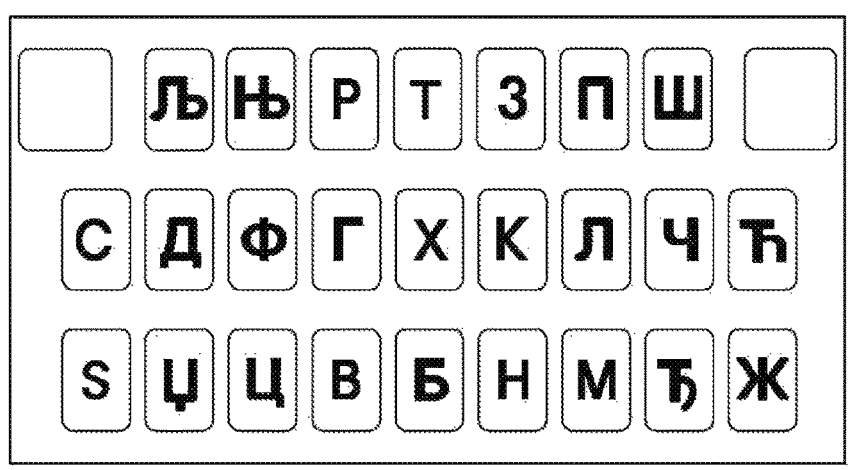

FIGS. 20A and 20B respectively illustrate a typical Serbian Cyrillic keyboard and a Serbian Cyrillic keyboard for inputting consonant characters according to an embodiment of the present invention.

FIG. 20A shows an example of a typical Serbian Cyrillic keyboard. According to an embodiment of the present invention, as shown in FIG. 20B, a consonant-dedicated virtual keyboard having a 3-row 25-key layout may be created. FIG. 20B shows an example in which an arbitrary editing key is laid out in a first row, instead of a typical third row, so as to maximize a size of each key.

Figure 21A:
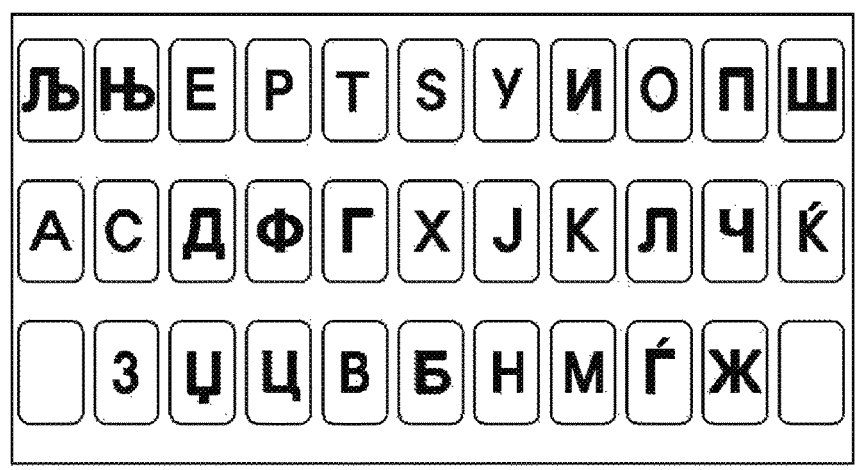
FIGS. 21A and 21B respectively illustrate a typical Macedonian keyboard and a Macedonian keyboard for inputting consonant characters according to an embodiment of the present invention.
Figure 21B:
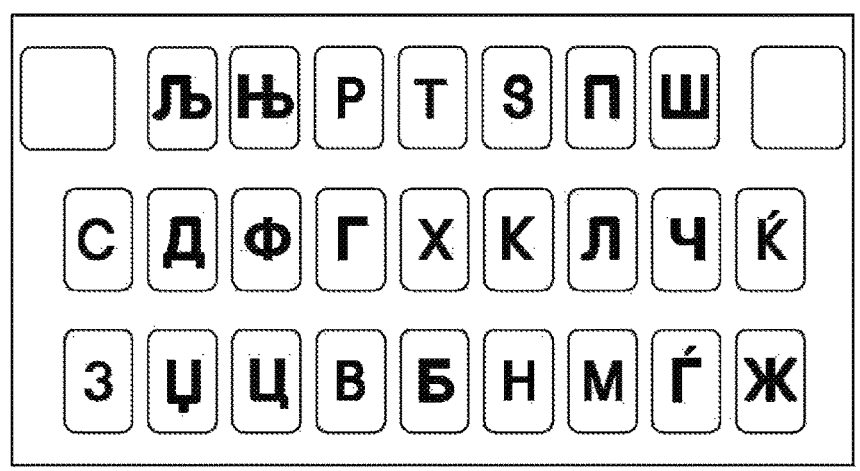

FIGS. 21A and 21B respectively illustrate a typical Macedonian keyboard and a Macedonian keyboard for inputting consonant characters according to an embodiment of the present invention.

FIG. 21A shows an example of a typical Macedonian keyboard. According to an embodiment of the present invention, as shown in FIG. 21B, a consonant-dedicated virtual keyboard having a 3-row 25-key layout may be created. FIG. 21B shows an example in which an arbitrary editing key is laid out in a first row, instead of a typical third row, so as to maximize a size of each key.

Figure 22:
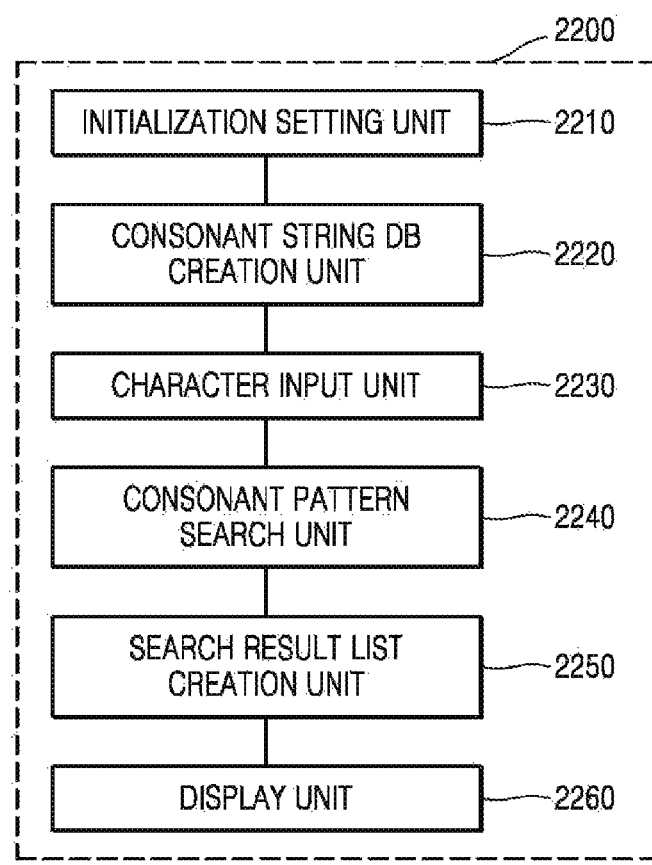
FIG. 22 is a block diagram of an integrated multilingual constant pattern apparatus according to an embodiment of the present invention.

FIG. 22 is a block diagram of an integrated multilingual constant pattern apparatus according to an embodiment of the present invention.

According to an embodiment of the present invention, an integrated multilingual consonant pattern search apparatus 2200 for extracting and displaying at least one string by inputting a plurality of consonants from among a pre-stored original string list, the apparatus including an initialization setting unit 2210 for initializing a DB and creating the original string list to be searched for, a consonant string DB creation unit 2220 for reading the original string list to be searched for and creating a DB of a consonant string to be searched for with respect to respective representative languages, a character input unit 2230 for receiving a first consonant pattern that includes a plurality of consonants to be searched for, a consonant pattern search unit for a second consonant pattern that matches the first consonant pattern in the DB of the consonant string to be searched for, based on a representative language related to the character input unit, a search result list creation unit 2250 for creating a search result list that includes at least one consonant string, which includes the searched for second consonant pattern, and a display unit 2260 for sorting and displaying the created search result list according to predetermined criteria. A second consonant pattern may be a pattern that has a same order of character placement as the first consonant pattern, but is combined by extracting a plurality of consonant characters included in a consonant string to be searched for regardless of an interval between the plurality of consonant characters.

The consonant string DB creation unit 2220 may select a representative language that is expressed as a first script from a language-script group, which is pre-classified based on a similarity between alphabet scripts for each language and convert at least one string, expressed as a second script that is included the language-script group, into at least one string, which is expressed as the first script of the representative language.

The consonant string DB creation unit 2220 may create a DB of a consonant string to be searched for, based on a representative language that corresponds to the character input unit connected to the integrated multilingual consonant pattern search apparatus.

Detailed operations of the character input unit 2230, the consonant pattern search unit 2240, and the search result list creation unit 2250 will be described with respect to FIG. 23.

Figure 23:
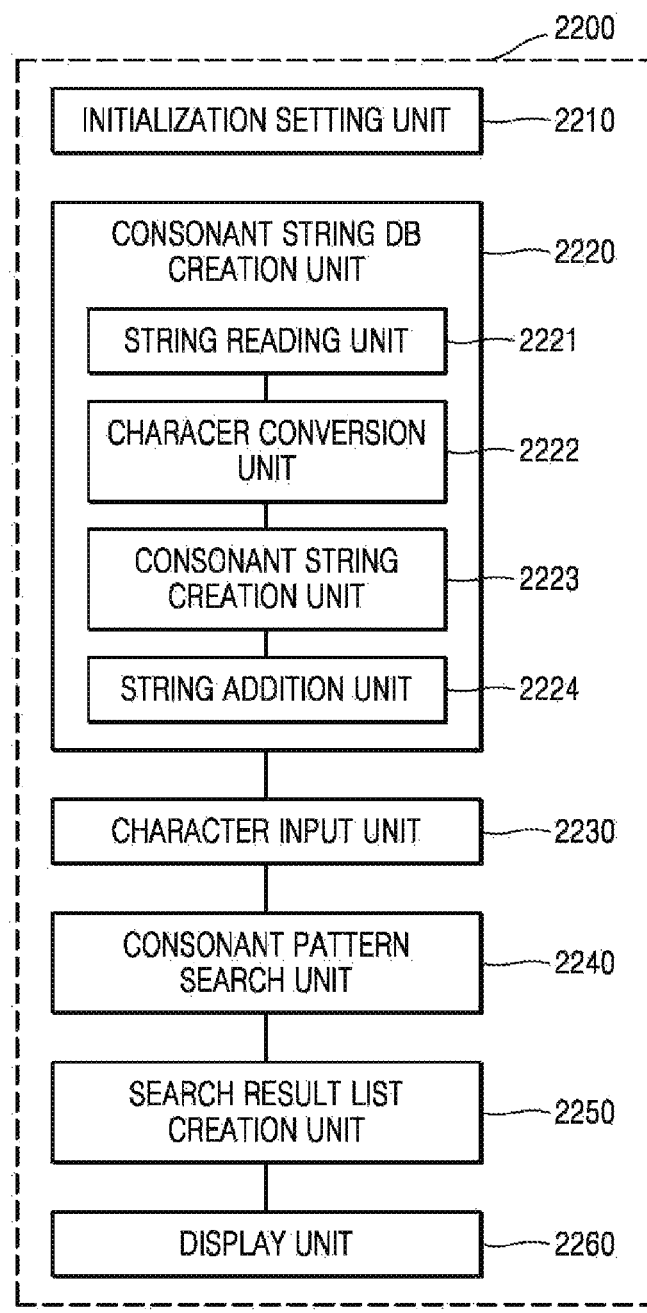
FIG. 23 is a block diagram of the integrated multilingual consonant pattern search apparatus according to another embodiment of the present invention.

FIG. 23 is a block diagram of the integrated multilingual consonant pattern search apparatus according to another embodiment of the present invention;

The consonant string DB creation unit 2220 may include a string reading unit 2221 for sequentially reading original strings one by one from the pre-stored original consonant list, a character conversion unit 2222 for converting each character included in the read original strings into a representative character based on a representative character mapping table that is set for the respective representative languages, a consonant string creation unit 2223 for creating a consonant string by removing a character, other than characters that are included in a first character set which is set for the respective representative languages, from the converted character string, and a string addition unit 2224 for adding the created consonant string to the DB of the consonant string to be searched for. The sequentially reading of the original strings, the converting of each character into a representative character, the creating of the consonant string, and the adding of the created consonant string to the DB may be performed with respect to all the original strings included in the original string list.

According to an embodiment of the present invention, the first character set may include a character set that includes at least one of an initial consonant and a final consonant, or a character set that includes an initial letter.

According to an embodiment of the present, the created consonant string may be sequentially added to the DB of the consonant string to be searched for, in correspondence with the original string list without additional sorting.

The initialization setting unit 2210 may create a root index table in the DB of the consonant string to be searched for. When m consonant characters are extracted from a consonant string to be searched for, which includes n consonant characters, if a minimum value of $M_{min}$ of a number m of consonants is equal to or greater than 2, the initialization setting unit 2210 may create predetermined index tables, having consonant patterns whose number is at least equal to or greater than 1 and equal to or less than $(M_{min}-1)$ as a key, in the DB of the consonant string to be searched for, with respect to all characters that belong to the first character set in correspondence with the representative language.

When m consonant characters are extracted from the consonant string to be searched for, which includes n consonant characters, the string addition unit 2224 may extract from the consonant string a combination of all second consonant patterns whose number m of consonants to be extracted is equal to or greater than a minimum number $M_{min}$ and equal to or less than a maximum number $M_{max}$, and add a pointer, which points at a consonant string that includes the consonant pattern, to all index tables having a string of the respective extracted second consonant pattern as an index key.

When the pointer is added to the index table, if an index table that corresponds to the extracted second consonant pattern is not created, the string addition unit 2224 may dynamically create the index table based on the extracted second consonant pattern, and link the dynamically-created index table that is a sub-index table to the super-index table. The super-index table may be an index table that has an index key in a pattern that is obtained by excluding from the sub-index table a consonant character at a last part of an index key in the sub-index table.

When the combination of all the second consonant patterns is extracted by the string addition unit 2224, if m consonant characters are extracted from the consonant string to be searched for, which includes the n consonant characters, a maximum value of all consonant patterns that will be extracted without redundancy may be determined as shown below.

$$\text{(Maximum value of a number of cases of a combination of consonant patterns)} = \sum_{m=M_{min}}^{M_{max}} {}_nC_m = \sum_{m=M_{min}}^{M_{max}} \frac{n!}{m!(n-m)!}$$

When the first consonant pattern that includes a plurality of consonants is received via the character input unit 2230, an input of all vowel keys via the character input unit 2230 may be limited.

The consonant pattern search unit 2240 may sequentially read all consonant strings included in the DB of the consonant string to be searched for, which is created as a representative language related to the character input unit 2230, and search for the second consonant pattern by comparing the first consonant pattern to the read consonant string.

The search result list creation unit 2250 may create the search result list by extracting and listing at least one consonant string that includes the searched for second consonant pattern, with respect to all consonant strings included in the DB of the consonant string to be searched for.

The consonant pattern search unit 2240 may reference the root index table as a current index table and set a loop variable k to 0, may compare an index key of the current index table to the first consonant pattern, and if an index key of the current index table does not match the first consonant pattern, may search for a sub-index table that matches the first consonant pattern by comparing a kth character of the first consonant pattern to a kth character that is a character placed at a last position of an index key of at least one sub-index table connected to the current index table, reference the searched for sub-index table as the current index table and increase the loop variable k by 1, and then, recompare the index key of the current index table to the first consonant pattern. If the index key of the current index table matches the first consonant pattern, the consonant pattern search unit 2240 may designate the current index table as a search result index table.

While the comparing or the recomparing is performed, if the index key of the current index table matches the first consonant pattern, the search result list creation unit 2250 may create as a search result list at least one consonant string that the search result index table points at. If the index key of the current index table that matches the first consonant pattern is not found, the search result list creation unit 2250 may create a search result list that shows the search result is not present.

Figure 24:
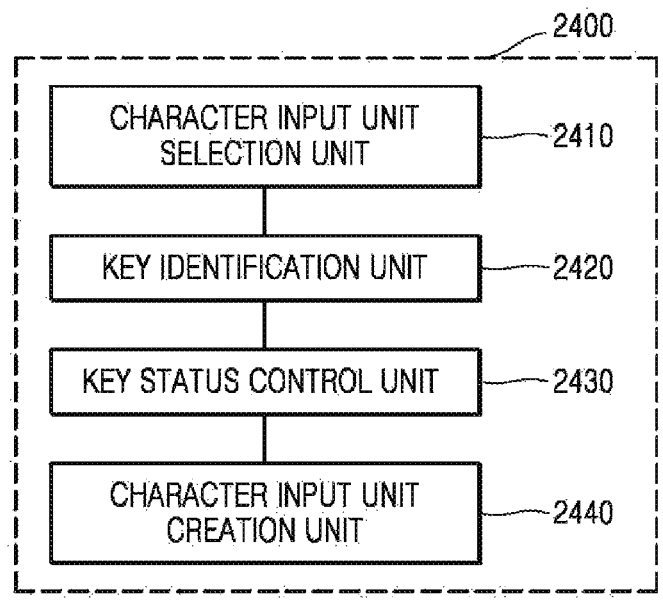
FIG. 24 is a block diagram of an apparatus for creating a character input unit for inputting a consonant character, according to an embodiment of the present invention.

FIG. 24 is a block diagram of an apparatus 2400 for creating a character input unit for inputting a consonant character, according to an embodiment of the present invention.

According to an embodiment of the present invention, the apparatus 2400 for creating a character input unit for inputting consonant characters may include a character input unit 2410 for selecting a first character input unit having a predetermined keyboard array, a key identification unit 2420 for identifying consonant keys, vowel keys, and additional function keys from among a plurality of character keys arrayed on the first character input unit, a key status control unit 2430 for activating at least one of the consonant keys and the additional function keys from among the identified plurality of keys and deactivating the other keys, and the character input unit creation unit 2440 for creating a second character input unit by using the activated keys.

The key status control unit 2430 may remove other keys than the consonant keys or the additional function keys, from among the identified plurality of keys, or limit an input of the other keys.

Figure 25:
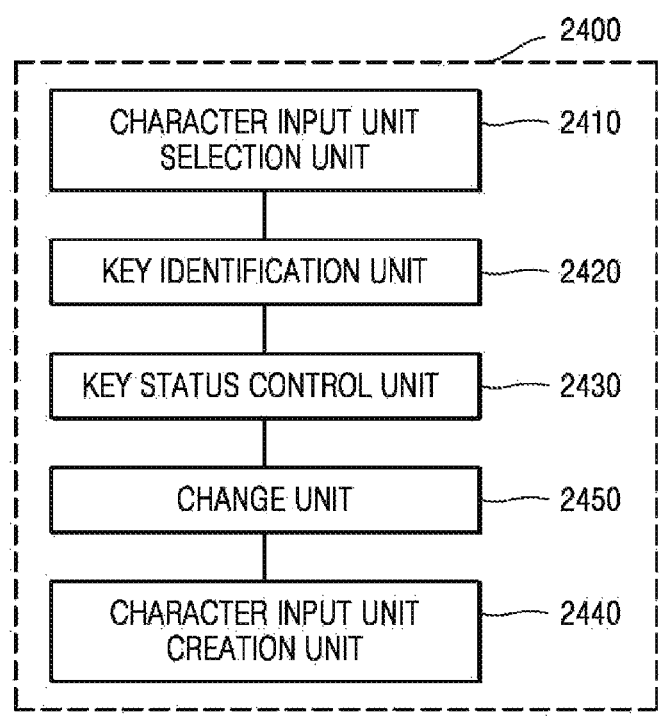
FIG. 25 is a block diagram of an apparatus for creating a character input unit for inputting a consonant character, according to another embodiment of the present invention.

FIG. 25 is a block diagram of an apparatus for creating a character input unit for inputting a consonant character, according to another embodiment of the present invention.

According to an embodiment of the present invention, the apparatus 2400 for creating a character input unit for inputting a consonant character may further include a change unit 2540 for changing at least one of a location and a size of the activated consonant key or the activated additional function key. A second character input unit may be created to include a key of which at least one of a location and a size is changed.

The change unit 2450 may group phonologically-related characters with respect to the consonant, determine a representative character for each group obtained by the grouping, remove characters that belong to the group other than the determined representative character, and change at least one of a location and a size of a key that represents the determined representative character.

The determining of the representative character for each group obtained by the grouping may create a key mapping table for mapping the consonant key as the representative character, and determine a representative character for each group obtained by the grouping according to the created key mapping table.

The key status control unit 2430 may selectively activate only characters that are used as initial consonants or only consonants and vowels that are used as initial letters, from among the identified plurality of keys, according to characteristics of a representative language which the first character input unit belongs to, and selectively deactivate or remove a consonant that is used as a final consonant.

The first character input unit and the second character input unit may include a phonetic keyboard or a virtual keyboard.

As described above, according to an embodiment of the present invention, with respect to an original string list of a language that is written with a phonogram in which an initial consonant and a final consonant are differentiated from each other, an integrated search for a consonant pattern in an arbitrary location, which may be non-consecutive, for each representative language may be performed by using the integrated multilingual consonant pattern search method. In other words, when a user is to search for data of interest, a high-speed search may be performed only by inputting characters at minimum, and even if a high capacity of data is to be searched for, more accurate search results may be provided compared to a typical method. Thus, the user may easily review a search result. Additionally, with respect to main languages in the world, which are written with phonograms, a consistent and integrated search may be performed for each language.

Additionally, according to a method of creating a character input unit for inputting a consonant, a typing error rate may be reduced and a character input speed may be improved by creating and using a character input unit for inputting a consonant character, which corresponds to a phonetic standard character input unit for each nation, (for example, a keyboard). In other words, even if a character is input via a small-sized character input unit that may be provided be a mobile apparatus or the like, a typing error rate may be minimized and a user may input characters faster compared to when using a conventional method.

A detailed description of an example of effects, provided above, is as follows.

A comparison result, shown below, clearly shows a difference between search results that are respectively obtained by performing a typical initial search method, a consecutive consonant search method, and a consonant pattern search method in the present invention. As shown in the comparison result shown below, the consonant pattern search method in the present invention may completely include the initial consonant search method and the consecutive consonant search method in theory, and also search for a non-consecutive consonant pattern that may not be searched for by performing an initial consonant search and a consecutive consonant search.

| Search input | Initial consonant search | Consecutive consonant search | Consonant pattern search |
| --- | --- | --- | --- |
| "ㄱㄷ" | Yes | No | Yes |
| "ㅎㄱㄷ" | Yes | No | Yes |
| "ㄱㄹㄷㅇ" | No | Yes | Yes |
| "ㅎㅇㄱㄹㄷㅇ" | No | Yes | Yes |
| "ㅎㄷ" | No | No | Yes |
| "ㅎㅇㄱㄷ" | No | No | Yes |
| "ㅎㅇㄱㄷㅇ" | No | No | Yes |

Additionally, a comparison result, shown below, clearly shows a difference between search results that are respectively obtained by performing a typical string prefix search, a word prefix search, a substring search, a word initial letter search method, and a consonant pattern search method in the present invention, in a case of English.

| Search input | String prefix search | Word prefix search | Substring search | Word initial letter search | Consonant pattern search |
| --- | --- | --- | --- | --- | --- |
| "ch" | Yes | Yes | Yes | No | Yes |
| "br" | No | Yes | Yes | No | Yes |
| "wn" | No | No | Yes | No | Yes |
| "cb" | No | No | No | Yes | Yes |
| "clb" | No | No | No | No | Yes |
| "chrlbrwn" | No | No | No | No | Yes |

An initial search, which is a most effective search method that has been widely used, may be performed by just inputting a key at minimum. However, since a search may be performed when initial consonants are matched, if an amount of whole data is comparatively large, too many irrelevant search results may be obtained, and thus, a screen may have to be scrolled and a search may be inconvenient. On the contrary, with regard to a consonant pattern search, since a final consonant may be further input in addition to an initial consonant, a number of search results may be limited much more compared to the initial search. A qualitative comparison result, shown below, shows a qualitative comparison result with respect to a number of search input characters and a possibility of necessity of scrolling, by comparing a typical initial search to the consonant pattern search in the present invention in a case of Korean.

| Search input | Number of characters | Number of results | Possibility of necessity of scrolling | Initial consonant search | Consonant pattern search |
| --- | --- | --- | --- | --- | --- |
| "ㄱㄷ" | 2 | Greatest | Very high | Yes | Yes |
| "ㅎㄱㄷ" | 3 | Many | High | Yes | Yes |
| "ㅎㅇㄷ" | 4 | Several | Low | No | Yes |
| "ㅎㄱㄹㄷ" | 4 | Several | Low | No | Yes |
| "ㅎㄱㄷㅇ" | 4 | Several | Low | No | Yes |
| "ㅎㄱㄹㄷㅇ" | 5 | Small | Very low | No | Yes |
| "ㅎㅇㄹㄷㅇ" | 6 | Smallest | Rare | No | Yes |

If a consonant-dedicated keyboard layout is used, effects such as minimization of a typing error rate and a fast input may be obtained. Such effects may be improved by sufficiently increasing a size of each key, compared to a typical standard keyboard. As an example, in a case of Korean consonant-dedicated keyboard, a size of each key may be increase by 92%, by expanding a size of consonant keys instead of removing unnecessary vowel keys. For example, for a two-set Korean keyboard layout, in a typical standard keyboard, a "ㄱ" key has a pixel size of 52×76. In a consonant-dedicated keyboard, a "ㄱ" key has a pixel size of 100×76, which is 192% larger in terms of area.

For example, in a case of English QWERTY keyboard, a total of 5 vowel keys, that is, 19% of all keys are displayed as a dummy key in a consonant-dedicated keyboard, and an input thereby is prohibited. Accordingly, a waste of time, which may be caused by inputting a vowel that is not used for a search by mistake, may be fundamentally prevented, and a typing error rate of consonant keys nearby vowels may be comparatively reduced, and resultantly, an input may be made fast. For example, in an English QUERTY Keyboard layout, a consonant-dedicated keyboard may have the vowels 'E,' 'U,' 'I,' 'O,' and 'A' disabled, for a rate of disabled keys of 19%.

With regard to another effect of the consonant-dedicated keyboard, since only keys that may be actually input by a user may be visually shown, a method of use is intuitive. In other words, keys that may be input, from among keys on a keyboard, may not have to be explained to a user. Such effect is essential to a mobile apparatus that is used by a user who does not read a user's manual.

With regard to FIGS. 1A and 1B, a comparison between results obtained by searching for a name "James Smith", from among 1,000 names that are arbitrarily created, respectively by using a typical word prefix search and by using a consonant pattern search is shown below.

| Search method (input condition) | Input search string | Length of a search string | Number of search results | Display of top 4 | Search performance comparison index |
| --- | --- | --- | --- | --- | --- |
| Word prefix | "ja" | 2 | 79 | No | 7 to 8 characters |
| | "jam" | 3 | 43 | No | |

-continued

| Search method (input condition) | Input search string | Length of a search string | Number of search results | Display of top 4 | Search performance comparison index |
|---|---|---|---|---|---|
| | "jame" | 4 | 43 | No | |
| | "james" | 5 | 43 | No | |
| | "james " | 6 | 43 | No | |
| | "james s" | 7 | 6 | (partially) Yes | |
| | "james sm" | 8 | 4 | Yes | |
| Consonant character pattern (input of initial character) | "js" | 2 | 194 | No | 4 characters |
| | "jss" | 3 | 38 | No | |
| | "jssm" | 4 | 6 | Yes | |
| Consonant character pattern (minimum number of inputs) | "jt" | 2 | 64 | No | 3 characters |
| | "jth" | 3 | 32 | Yes | |
| Consonant character pattern (Only result) | "im" | 2 | 87 | No | 5 characters |
| | "jms" | 3 | 54 | No | |
| | "jmss" | 4 | 18 | No | |
| | "jmssm" | 5 | 4 | Yes | |

The following underlined names are top 4 in an alphabetical order, and may be displayed on a screen without scrolling right after the searching In a case of a word prefix search

| | |
|---|---|
| "jam" | Gary James, James Brown, James Brown, James Campbell, James Clark, James Cook, |
| "jame" | James Cook, James Cooper, James Davis, James Davis, James Davis, James Garcia, |
| "james" | James Gonzalez, James Harris, James Hill, James James, James Johnson, James King, |
| "james " | James Lewis, James Long, James Long, James Martinez, James Miller, James Miller, James Miller, James Moore, James Moore, James Nelson, James Perry, James Phillips, James Phillips, James Richardson, James Sanchez, James Scott, James Smith, James Smith, James Smith, James Smith, James Washington, James White, Justin James, Lillian James, Robert James |
| "james s" | James Sanchez, James Scott, James Smith, James Smith, James Smith, James Smith |
| "james sm" | James Smith, James Smith, James Smith, James Smith |

In a case of a consonant character pattern

| | |
|---|---|
| "jss" | James Davis, James Davis, James Davis, James Harris, James James, James Johnson, James Lewis, James Nelson, James Sanchez, James Scott, James Smith, James Smith, James Smith, James Smith, James Washington, Jason Edwards, Jason Gonzales, Jason Henderson, Jesse Hill, Jesse Powell, Jesse Rodriguez, Jessica Baker, Jessica Clark, Jessica Hill, Jessica Roberts, Jessica Thomas, John Russell, Jose Anderson, Jose Johnson, Joseph Adams, Joseph Johnson, Joseph Jones, Joseph Lewis, Joseph Smith, Joshua Thomas, Justin James, Justin Stewart, Justin Watson |
| "jssm" | James Smith, James Smith, James Smith, James Smith, Jessica Thomas, Joseph Smith |
| "jth" | James Smith, James Smith, James Smith, James Smith, Janet Harris, Jason Mitchell, Jeffrey Mitchell, Jeffrey Smith, Jeffrey Smith, Jeffrey Smith, Jeffrey Thomas, Jennifer Thomas, Jeremy Smith, Jessica Thomas, Joan Mitchell, Joe Smith, Joe Smith, John Mitchell, John Smith, John Smith, John Smith, John Thomas, John Thompson, John Thompson, Jonathan Carter, Jonathan Green, Jonathan Taylor, Joseph Smith, Joshua Thomas, Joyce Thompson, Judith Nelson, Judy Mitchell |
| "jmss" | James Davis, James Davis, James Davis, James Harris, James James, James Johnson, James Lewis, James Nelson, James Phillips, James Phillips, James Richardson, James Sanchez, James Scott, James Smith, James Smith, James Smith, James Smith, James Washington |
| "jmssm" | James Smith, James Smith, James Smith, James Smith |

According to an analysis on the comparison result, the consonant character pattern search method in the present invention has a much higher performance index, that is, allows a fast search with much less characters, compared to a typical word prefix search method. An analysis of an effect thereof is follows: Whereas 7 to 8 characters need to be input so as to find a final result without scrolling by using a typical method, a final result may be found just by inputting 3 to 5 characters. Whereas characters may be input by using one method in the typical method (a consecutive input from a word prefix), various patterns may be input and in most cases, a minimum number of characters input from a consonant pattern in the method of the present invention (for example, 3 characters for jth). A minimum number of characters input from a consonant pattern may be obtained empirically or by using programming.

A description provided above may be applied to an apparatus of an embodiment of the present invention. Accordingly, with regard to the apparatus, a same description provided above will not be provided here again.

As described above, according to the one or more of the above embodiments of the present invention, with respect to an original string list of a language that is written with a phonogram in which an initial consonant and a final consonant are differentiated from each other, an integrated search for a consonant pattern in an arbitrary location, which may be non-consecutive, for each representative language may be performed by using the integrated multilingual consonant pattern search method. In other words, when a user is to search for data of interest, a high-speed search may be performed only by inputting characters at minimum, and even if a high capacity of data is to be searched for, more accurate search results may be provided compared to a typical method. Thus, the user may easily review a search result. Additionally, with respect to main languages in the world, which are written with phonograms, a consistent and integrated search may be performed for each language.

Additionally, according to a method of creating a character input unit for inputting a consonant, a typing error rate may be reduced and a character input speed may be improved by creating and using a character input unit for inputting a consonant character, which corresponds to a phonetic standard character input unit for each nation, (for example, a keyboard). In other words, even if a character is input via a small-sized character input unit that may be provided be a mobile apparatus or the like, a typing error rate may be minimized and a user may input characters faster compared to when using a conventional method.

In addition, other embodiments of the present invention can also be implemented through computer-readable code/instructions in/on a medium, e.g., a computer-readable medium, to control at least one processing element to implement any above described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present invention. The media may also be a distributed network, so that the computer-readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. An integrated multilingual consonant pattern search method of extracting and displaying at least one string by inputting consonants from a stored original string list, the integrated multilingual consonant pattern search method comprising:
   initializing, by a processor, a database (DB), and creating the original string list to be searched for;
   reading, by the processor, the original string list to be searched for and creating a DB of a consonant string to be searched for with respect to respective representative languages;
   receiving, by the processor, a first consonant pattern comprising consonants that are input via a character input unit;
   searching, by the processor, for a second consonant pattern that matches the first consonant pattern in the DB of the consonant string to be searched for, wherein the DB of the constant string to be searched for is created based on a representative language related to the character input unit;
   creating, by the processor, a search result list comprising at least one consonant string comprising the searched second consonant pattern; and
   sorting and displaying, by the processor, the created search result list according to criteria,
   wherein the second consonant pattern comprises a same order of character array as the first consonant pattern, and is obtained by extracting and combining consonant characters included in the consonant string to be searched for regardless of an interval between the consonant characters.

2. The integrated multilingual consonant pattern search method of claim 1, wherein the creating of the DB of the consonant string to be searched for with respect to the respective representative languages comprises:
   selecting a representative language that is expressed as a first script from a language-script group, which is classified based on a similarity between alphabet scripts for each language; and
   converting at least one string, which is expressed as a second script that is included in the language-script group, into another at least one string, which is expressed as the first script of the representative language.

3. The integrated multilingual consonant pattern search method of claim 1, wherein the creating of the DB of the consonant string to be searched for with respect to respective representative languages comprises creating the DB of the consonant string to be searched for based on a representative language that corresponds to the character input unit.

4. The integrated multilingual consonant pattern search method of claim 1, wherein the creating of the DB of the consonant string to be searched for with respect to the respective representative languages comprises:
   sequentially reading original strings from the stored original consonant list;
   converting each character included in the read original strings into a representative character based on a representative character mapping table that is set for the respective representative languages;
   creating a consonant string by removing a character, other than characters that are included in a first character set, which is set for the respective representative languages, from the converted character string; and
   adding the created consonant string to the DB of the consonant string to be searched for,
   wherein the sequential reading of the original strings, the converting of each character into a representative character, the creating of the consonant string, and the adding of the created consonant string to the DB is performed with respect to all original strings included in the original string list.

5. The integrated multilingual consonant pattern search method of claim 4, wherein the first character set comprises a character set that comprises either one or both of an initial consonant and a final consonant, and a character set that comprises an initial letter.

6. The integrated multilingual consonant pattern search method of claim 4, wherein the created consonant string is sequentially added to the DB of the consonant string to be searched for, in correspondence with the original string list, without additional sorting.

7. The integrated multilingual consonant pattern search method of claim 4, wherein
   the initializing of the DB and the creating of the original string list to be searched for comprise
      creating a root index table in the DB of the consonant string to be searched for, and
      when m consonant characters are extracted from the consonant string to be searched for, which comprises n consonant characters, in response to a minimum value of $M_{min}$ of a number of consonants m being equal to or greater than 2, creating index tables, comprising consonant patterns whose number is greater than or equal to 1 and less than or equal to ($M_{min}-1$) as a key, in the DB of the consonant string to be searched for with respect to all characters that belong to the first character set in correspondence with the representative language, and the adding of the created consonant string to the DB of the consonant string to be searched for comprises extracting a combination of all second consonant patterns whose number m of consonants to be extracted is equal to or greater than a minimum number $M_{min}$ and equal to or less than a maximum number $M_{max}$, when m consonant characters are extracted from the consonant string to be searched for, which comprises n consonant characters, and adding a pointer, which points at a consonant string that comprises the second consonant pattern, to all index tables comprising a string of the respective extracted second consonant pattern as an index key.

8. The integrated multilingual consonant pattern search method of claim 7, wherein the adding of the pointer comprises dynamically creating an index table based on the extracted second consonant pattern, in response to the index table, which corresponds to the extracted second consonant pattern, not being created, and linking the dynamically created index table, which is a sub-index table to the super-index table, and wherein the super-index table is an index table that has an index key in a pattern that is obtained by excluding from the sub-index table a consonant character at a last position of an index key in the sub-index table.

9. The integrated multilingual consonant pattern search method of claim 7, wherein, in response to the m consonant characters being extracted from the consonant string to be searched for, a maximum value of all consonant patterns that will be extracted without redundancy is determined as according to:

$$\text{(Maximum value of a number of cases of a combination of consonant patterns)} = \sum_{m=M_{min}}^{M_{max}} {}_nC_m = \sum_{m=M_{min}}^{M_{max}} \frac{n!}{m!(n-m)!}.$$

10. The integrated multilingual consonant pattern search method of claim 1, wherein the receiving of the first consonant pattern that comprises the consonants input via the character input unit further comprises limiting an input of all vowel keys via the character input unit.

11. The integrated multilingual consonant pattern search method of claim 6, wherein the searching for the second consonant pattern that matches the first consonant pattern in the DB of the consonant string to be searched for comprises:

sequentially reading of all consonant strings comprised in the DB of the consonant string to be searched for, which is created as a representative language related to the character input unit; and searching for the second consonant pattern by comparing the first consonant pattern to the read consonant string, wherein the creating of a search result list, which comprises at least one consonant string that comprises the searched second consonant pattern, comprises creating the search result list by extracting and listing at least one consonant string that comprises the searched second consonant pattern, with respect to all consonant strings included in the DB of the consonant string to be searched for.

12. The integrated multilingual consonant pattern search method of claim 7, wherein the searching for the second consonant pattern that matches the first consonant pattern in the DB of the consonant string to be searched for comprises:

referencing the root index table as a current index table and setting a loop variable k to 0;

comparing an index key of the current index table to the first consonant pattern;

in response to an index key of the current index table not matching the first consonant pattern, searching for a sub-index table that matches the first consonant pattern by comparing a kth character of the first consonant pattern to a kth character that is a character placed at a last position of an index key of at least one sub-index table connected to the current index table, referencing the searched for sub-index table as the current index table and increasing the loop variable k by 1, and recomparing the index key of the current index table to the first consonant pattern; and in response to an index key of the current index table matching the first consonant pattern, designating the current index table as a search result index table, wherein the creating of the search result list comprises, in response to the index key of the current index table matching the first consonant pattern, creating as a search result list at least one consonant string that the search result index table points at, and in response to the index key of the current index table that matches the first consonant pattern not being found, creating a search result list that shows the search result is not present.

13. An integrated multilingual constant pattern apparatus to extract and display at least one string by inputting consonants from among a stored original string list, the integrated multilingual constant pattern apparatus comprising:

a processor comprising:

an initialization setter configured to analyze a database (DB), and create an original string list to be searched for;

a consonant string DB creator configured to read the original string list to be searched for and create a DB of a consonant string to be searched for with respect to respective representative languages;

a character inputter configured to receive a first consonant pattern comprising consonants to be searched for;

a consonant pattern searcher configured to search for a second consonant pattern that matches the first consonant pattern in the DB of the consonant string to be searched for, based on a representative language related to the character inputter;

a search result list creator configured to create a search result list that comprises at least one consonant string comprising the searched second consonant pattern; and a displayer configured to sort and display the created search result list according to criteria, wherein a second consonant pattern is a pattern comprising a same order of character placement as the first consonant pattern, and is combined by extracting consonant characters included in a consonant string to be searched for regardless of an interval between the consonant characters.

14. The integrated multilingual constant pattern apparatus of claim 13, wherein the consonant string DB creator is further configured to select a representative language that is expressed as a first script from a language-script group, which is classified based on a similarity between alphabet scripts for each language, and convert at least one string, which is expressed as a second script that is included the language-script group, into another at least one string, which is expressed as the first script of the representative language.

15. The integrated multilingual constant pattern apparatus of claim 13, wherein the consonant string DB creator is further configured to create the DB of the consonant string to be searched for based on a representative language that corresponds to the character inputter.

16. The integrated multilingual constant pattern apparatus of claim 13, wherein the consonant string DB creator comprises
a string reading reader configured to sequentially read original strings one by one from the stored original consonant list,
a character converter configured to convert the each of characters included in the read original strings into a representative character based on a representative character mapping table that is set for the respective representative languages,
a consonant string creator configured to create a consonant string by removing a character, other than characters that are included in a first character set which is set for the respective representative languages, from the converted character string, and
a string adder configured to add the created consonant string to the DB of the consonant string to be searched for,
wherein the sequential reading of the original strings, the converting of the each character into a representative character, the creating of the consonant string, and the adding of the created consonant string to the DB are performed with respect to all original strings included in the original string list.

17. The integrated multilingual constant pattern apparatus of claim 16, wherein the first character set comprises a character set that comprises either one or both of an initial consonant and a final consonant, and a character set that comprises an initial letter.

18. The integrated multilingual constant pattern apparatus of claim 16, wherein the created consonant string is sequentially added to the DB of the consonant string to be searched for, in correspondence with the original string list, without additional sorting.

19. The integrated multilingual constant pattern apparatus of claim 16, wherein the initialization setter is further configured to create a root index table in the DB of the consonant string to be searched for, and when m consonant characters are extracted from the consonant string to be searched for, which comprises n consonant characters, in response to a minimum value of $M_{min}$ of a number of consonants m being equal to or greater than 2, creating index tables, comprising consonant patterns whose number is equal to or greater than 1 and equal to or less than ($M_{min}-1$) as a key, in the DB of the consonant string to be searched for with respect to all characters that belong to the first character set in correspondence with the representative language, and
the string adder is further configured to extract a combination of all second consonant patterns whose number m of consonants to be extracted is greater than or equal to a minimum number $M_{min}$ and less than or equal to a maximum number $M_{max}$, when m consonant characters are extracted from the consonant string to be searched for, which comprises n consonant characters, and adds a pointer, which points at a consonant string that comprises the second consonant pattern, to all index tables comprising a string of the respective extracted second consonant pattern as an index key.

20. The integrated multilingual constant pattern apparatus of claim 19, wherein
the string adder is further configured to, in response to an index table that corresponds to the extracted second consonant pattern not being created, dynamically create the index table based on the extracted second consonant pattern, and link the dynamically-created index table, which is a sub-index table to the super-index table, and
the super-index table is an index table that has an index key in a pattern that is obtained by excluding from the sub-index table a consonant character at a last position of an index key in the sub-index table.

21. The integrated multilingual constant pattern apparatus of claim 19, wherein when the string adder extracts the combination of the second consonant patterns and the m consonant characters, a maximum value of all consonant patterns to be extracted without redundancy is determined according to:

$$(\text{Maximum value of a number of cases of a combination of consonant patterns}) = \sum_{m=M_{min}}^{M_{max}} {_nC_m} = \sum_{m=M_{min}}^{M_{max}} \frac{n!}{m!(n-m)!}.$$

22. The integrated multilingual constant pattern apparatus of claim 13, wherein an input of all vowel keys via the character inputter is limited when the first consonant pattern that comprises the consonants is input via the character inputter.

23. The integrated multilingual constant pattern apparatus of claim 18, wherein the consonant pattern searcher is further configured to sequentially read all consonant strings included in the DB of the consonant string to be searched for, which is created as a representative language related to the character inputter, and search for the second consonant pattern by comparing the first consonant pattern to the read consonant string, and
the search result list creator is further configured to create the search result list by extracting and listing at least one consonant string comprising the searched second consonant pattern, with respect to all consonant strings comprised in the DB of the consonant string to be searched for.

24. The integrated multilingual constant pattern apparatus of claim 19,
wherein the consonant pattern searcher is further configured to
reference the root index table as a current index table and set a loop variable k to 0, and compare an index key of the current index table to the first consonant pattern,
in response to an index key of the current index table not matching the first consonant pattern, search for a sub-index table that matches the first consonant pattern by comparing a kth character of the first consonant pattern to a kth character that is a character placed at a last position of an index key of at least one sub-index table connected to the current index table, reference the searched for sub-index table as the current index table and increase the loop variable k by 1, and recompare the index key of the current index table to the first consonant pattern, and in response to an index key of the current index table matching the first consonant pattern, designate the current index table as a search result index table, and wherein the search result list creator is further configured to, in response to the index key of the current index table matching the first consonant pattern, create as a search result list at least one consonant string that the search result index table points at, and in response to the index key of the current index table that matches the first consonant pattern not being found, create a search result list that shows that the search result is not present.

25. A non-transitory computer-readable storage medium storing instructions that, when executed by a processor, cause the processor to perform the method of any one of claims 1 to 12.

* * * * *